(12) United States Patent
Tamai et al.

(10) Patent No.: US 7,807,746 B2
(45) Date of Patent: Oct. 5, 2010

(54) CURABLE COMPOSITION

(75) Inventors: Hitoshi Tamai, Hyogo (JP); Ayako Yano, Hyogo (JP)

(73) Assignee: Kaneka Corporation, Osaka (JP)

( * ) Notice: Subject to any disclaimer, the term of this patent is extended or adjusted under 35 U.S.C. 154(b) by 703 days.

(21) Appl. No.: 10/588,363

(22) PCT Filed: Jan. 20, 2005

(86) PCT No.: PCT/JP2005/001048

§ 371 (c)(1),
(2), (4) Date: Mar. 27, 2007

(87) PCT Pub. No.: WO2005/075562

PCT Pub. Date: Aug. 18, 2005

(65) Prior Publication Data

US 2007/0213459 A1    Sep. 13, 2007

(30) Foreign Application Priority Data

Feb. 3, 2004   (JP) .............................. 2004-027331
Mar. 31, 2004  (JP) .............................. 2004-107453

(51) Int. Cl.
    C08L 83/00   (2006.01)
(52) U.S. Cl. ..................... 524/588; 528/901
(58) Field of Classification Search ................ 524/588; 528/901
    See application file for complete search history.

(56) References Cited

U.S. PATENT DOCUMENTS

| | | | |
|---|---|---|---|
| 5,755,867 A * | 5/1998 | Chikuni et al. | 106/287.16 |
| 6,930,147 B1 * | 8/2005 | Nakagawa et al. | 525/104 |
| 7,081,494 B2 * | 7/2006 | Fujita et al. | 524/543 |
| 7,297,743 B2 * | 11/2007 | Kanamori et al. | 524/523 |
| 2004/0127631 A1 | 7/2004 | Kanamori et al. | |
| 2005/0107547 A1 | 5/2005 | Ohno et al. | |
| 2005/0267251 A1 | 12/2005 | Iwakiri et al. | |

FOREIGN PATENT DOCUMENTS

| | | |
|---|---|---|
| EP | 1 391 484 A1 | 2/2004 |
| JP | 2000178456 A * | 6/2000 |
| JP | 2001-180979 | 7/2001 |
| JP | 2001-180979 A | 7/2001 |
| JP | 2002-194876 | 7/2002 |
| JP | 2002-194876 A | 7/2002 |
| JP | 2003-113324 | 4/2003 |
| JP | 2003-113324 A | 4/2003 |
| JP | 2003-313302 | 11/2003 |
| JP | 2003-313302 A | 11/2003 |
| JP | 2003-313397 | 11/2003 |
| JP | 2003-313397 A | 11/2003 |
| JP | 2003-327620 | 11/2003 |
| JP | 2003-327620 A | 11/2003 |
| JP | 2004-2604 A | 1/2004 |
| JP | 2004-2835 A | 1/2004 |
| JP | 2004-156023 | 6/2004 |
| JP | 2004-156023 A | 6/2004 |
| WO | WO 02/085985 A1 | 10/2002 |
| WO | WO02085985 * | 10/2002 |
| WO | WO 03/091291 A1 | 11/2003 |
| WO | WO 2004/035707 A1 | 4/2004 |

OTHER PUBLICATIONS

International Preliminary Report on Patentability (Chapter I of the Patent Cooperation Treaty) from Corresponding International Application No. PCT/JP2005/001048, dated Sep. 19, 2006, 6 pages.
International Search Report from Corresponding International Application No. PCT/JP2005/001048, dated Mar. 29, 2005, 1 page.

* cited by examiner

*Primary Examiner*—Kuo-Liang Peng
(74) *Attorney, Agent, or Firm*—Hamre, Schumann, Mueller & Larson, P.C.

(57) ABSTRACT

The present invention provides a curable composition capable of giving rubbery cured products having excellent adhesion properties to all-purpose substrates, improved weather-resistant adhesion properties to photocatalyst-coated transparent adherends, low modulus and high elongation and, further, showing high weather resistance without undergoing surface cracking or discoloration even when used outdoors for a long period of time. The curable composition of the present invention includes a vinyl polymer (I) and an antioxidant (II). A main chain of the vinyl polymer (I) is a product of living radical polymerization, and the vinyl polymer (I) contains at least one crosslinkable silyl group.

23 Claims, No Drawings

CURABLE COMPOSITION

RELATED APPLICATIONS

This application is a nationalization of PCT application PCT/JP2005/001048 filed on Jan. 20, 2005, claiming priority based on Japanese Application No. 2004-027331 filed on Feb. 3, 2004 and Japanese Application No. 2004-107453 filed on Mar. 31, 2004, the contents of which are incorporated herein by reference in their entirety.

TECHNICAL FIELD

The present invention relates to a curable composition comprising a vinyl polymer (I) the main chain of which is the product of living radical polymerization and which contains at least one crosslinkable silyl group, and an antioxidant (II).

BACKGROUND ART

Curable compositions having a crosslinkable silyl group-containing vinyl polymer are used as sealing materials for use in buildings for filling spaces between interior or exterior members of buildings or for sealing joints to prevent the invasion of wind and rain, or as adhesives for adhering various adherends. Sealing materials comprising the so-called modified silicone species whose main chain structure is a polyoxyalkylene polymer and which have one or more crosslinkable silyl groups are in wide use because of their good workability and good flexibility in a wide temperature range. In some instances, however, they are not sufficient in weather resistance to meet the recent prolonged working time requirement imposed on buildings, predominately for glazing applications.

In recent years, transparent adherends (photocatalyst-coated transparent substrates) coated with a composition having a photocatalytic activity (titanium oxide) have come into use as exterior materials from the maintenance-free viewpoint. Concerning this use, it has been shown that when modified silicone sealing materials or acrylic-modified silicone sealing materials superresistant to weathering are used, the weather resistant adhesion is unsatisfactory and that when crosslinkable silyl group-containing vinyl copolymer-based curing compositions are used, the surface weather resistance and weather-resistant adhesion properties are improved (cf. e.g. Japanese Patent Application 2003-344180). In the case of photocatalyst-coated transparent materials, however, the activity varies depending on the quantity of the photocatalyst applied to the surface and it is becoming more and more evident that when sealing materials comprising crosslinkable silyl group-containing vinyl copolymer-based curable compositions are applied to highly active photocatalyst-coated transparent materials, the weather-resistant adhesion properties are unsatisfactory in certain instances.

Although it has been shown that the addition of an antioxidant to a vinyl polymer-containing curable composition results in an improvement in thermal stability of the cured products derived from the curable composition (e.g. Japanese Kokai Publication 2003-113324), it has not yet been revealed that such a composition can have such a high level of weather resistant adhesion to photocatalyst-coated adherends as described hereinbelow.

SUMMARY OF THE INVENTION

The present invention provides a curable composition capable of giving rubbery cured products having excellent adhesion properties against all-purpose substrates, improved in weather-resistant adhesion properties against photocatalyst-coated transparent adherends, low in modulus and high in elongation and, further, showing high weather resistance without undergoing surface cracking or discoloration even when used outdoors for a long period of time.

In view of the above-discussed state of the art, the present inventors made intensive investigations and found a curable composition which can overcome the above-mentioned problems. Such and other findings have led to completion of the present invention.

Namely, the present invention relates to a curable composition for a transparent material which comprises a vinyl polymer (I) the main chain of which is the product of living radical polymerization and which contains at least one crosslinkable silyl group (hereinafter, the above vinyl polymer (I) is sometimes called simply as "a vinyl polymer (I)"), and an antioxidant (II) (hereinafter, the above curable composition is sometimes called simply as "a curable composition").

The preferred embodiment relates to the above-mentioned curable composition wherein the transparent material is a material for building and construction, a material for civil engineering, a material for transport or a material for automobile.

The preferred embodiment relates to the above-mentioned curable composition wherein the transparent material is glass, a polycarbonate or a (meth)acrylic resin.

The preferred embodiment relates to the above-mentioned curable composition wherein the transparent material has a layer having photocatalytic activity-due antistaining properties as provided on the surface thereof.

The preferred embodiment relates to the above-mentioned curable composition wherein the surface layer having photocatalytic activity-due antistaining properties is a layer comprising a material having photocatalytic activity and, further, a hydrophilic material.

The preferred embodiment relates to the above-mentioned curable composition wherein the antioxidant (II) is a hindered phenol compound.

The preferred embodiment relates to the above-mentioned curable composition which further comprises a plasticizer (III).

The preferred embodiment relates to the above-mentioned curable composition wherein the plasticizer (III) is a phthalic ester.

The preferred embodiment relates to the above-mentioned curable composition wherein the plasticizer (III) is a polyoxyalkylene polymer.

The preferred embodiment relates to the above-mentioned curable composition wherein the vinyl polymer (I) has a molecular weight distribution of less than 1.8.

The preferred embodiment relates to the above-mentioned curable composition wherein a vinyl monomer constituting the main chain of the vinyl polymer (I) is mainly selected from the group consisting of (meth)acrylic monomers, acrylonitrile monomers, aromatic vinyl monomers, fluorine-containing vinyl monomers and silicon-containing vinyl monomers.

The preferred embodiment relates to
the above-mentioned curable composition
wherein the main chain of the vinyl polymer (I) is a (meth) acrylic polymer.

The preferred embodiment relates to
the above-mentioned curable composition
wherein the main chain of the vinyl polymer (I) is an acrylic polymer.

The preferred embodiment relates to
the above-mentioned curable composition
wherein the main chain of the vinyl polymer (I) is an acrylic ester polymer.

The preferred embodiment relates to
the above-mentioned curable composition
wherein the living radical polymerization for producing the main chain of the vinyl polymer (I) is the atom transfer radical polymerization.

The preferred embodiment relates to
the above-mentioned curable composition
wherein a transition metal complex used as the catalyst in the atom transfer radical polymerization is one composed of a VII, VIII, IX, X, or XI group element in the periodic table as a central metal.

The preferred embodiment relates to
the above-mentioned curable composition
wherein the metal complex used as the catalyst is a complex composed of copper, nickel, ruthenium or iron as a central metal.

The preferred embodiment relates to
the above-mentioned curable composition
wherein the metal complex used as the catalyst is a complex of copper.

The preferred embodiment relates to
the above-mentioned curable composition
wherein the crosslinkable silyl group of the vinyl polymer (I) is represented by the following general formula 1:

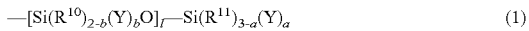

$$-[Si(R^{10})_{2-b}(Y)_{b}O]_{l}-Si(R^{11})_{3-a}(Y)_{a} \quad (1)$$

{wherein, $R^{10}$ and $R^{11}$ are the same or different and each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' represents a univalent hydrocarbon group containing 1 to 20 carbon atoms and the three R' groups may be the same or different) and, when there are two or more $R^{10}$ or $R^{11}$ groups, they may be the same or different; Y represents a hydroxyl group or a hydrolyzable group and, when there are two or more Y groups, they may be the same or different; a represents 1, 2 or 3, b represents 0, 1 or 2, and l represents an integer of 0 to 19, provided that the relation $a+lb \geqq 1$ should be satisfied.}

The preferred embodiment relates to
the above-mentioned curable composition
wherein the crosslinkable silyl group of the vinyl polymer (I) is at the terminus of the main chain.

The preferred embodiment relates to
the above-mentioned curable composition
which further comprises a polyoxyalkylene polymer (IV) containing at least one crosslinkable silyl group in an amount within the range of 0.1 to 1,000 parts by weight per 100 parts by weight of the vinyl polymer (I).

The preferred embodiment relates to
the above-mentioned curable composition
which further comprises a polymer (V) containing a crosslinkable silyl group as obtained by a radical polymerization technique other than living radical polymerization in an amount within the range of 3 to 300 parts by weight per 100 parts by weight of the vinyl polymer (I).

The preferred embodiment relates to
the above-mentioned curable composition
which further comprises 0.1 to 20 parts by weight of a tin curing catalyst (VI) per 100 parts by weight of the vinyl polymer (I).

Furthermore, the present invention relates to
an adhesive
which is produced by using the above-mentioned curable composition.

Furthermore, the present invention relates to
a sealing material
which is produced by using the above-mentioned curable composition.

Furthermore, the present invention relates to
a liquid gasket
which is produced by using the above-mentioned curable composition.

By using the curable composition of the present invention, a cured product having excellent adhesion properties against all-purpose substrates and, among these, excellent weather-resistant adhesion properties against photocatalyst-coated substrates can be obtained. Furthermore, by using the curable composition of the present invention, a cured product remaining low in surface staining for a long period of time, and showing high weather resistance without undergoing surface cracking or discoloration.

DETAILED DESCRIPTION OF THE INVENTION

The present invention relates to a curable composition for a transparent material comprising a vinyl polymer (I) the main chain of which is a product of living radical polymerization and which contains at least one crosslinkable silyl group, and an antioxidant (II). The term "crosslinkable silyl group" as used herein means a silicon-containing group containing a hydroxyl or hydrolyzable group bound to a silicon atom and capable of being crosslinked under formation of a siloxane bond.

In the following, the curable composition of the invention is described in detail.

<<Vinyl Polymer (I) Whose Main Chain is a Product of Living Radical Polymerization>>

<Main Chain>

As a vinyl monomer which constitutes the main chain of vinyl polymer (I) of the present invention is not particularly limited, and any of various monomers can be used. Examples of the vinyl monomer include (meth)acrylic acid monomers, such as (meth)acrylic acid, methyl(meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, ethylene oxide adduct of (meth)acrylic acid, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; aromatic vinyl monomers, such as styrene, vinyltoluene, α-methylstyrene, chlorostyrene, and styrenesulfonic acid and its salts; fluorine-containing vinyl monomers, such as perfluoroethylene, perfluoropropylene, and vinylidene fluoride; silicon-containing vinyl monomers, such as vinyltrimethoxysilane and vinyltriethoxysilane; maleic anhydride, maleic acid, and monoalkyl esters and dialkyl esters of maleic acid; fumaric acid and monoalkyl and dialkyl esters of fumaric acid; maleimide monomers, such as, maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers, such as acrylonitrile and methacrylonitrile; amido-containing vinyl monomers, such as acrylamide and methacrylamide; vinyl esters, such as vinyl acetate, vinyl propionate, vinyl private, vinyl benzoate, and vinyl cinnamate; alkenes, such as ethylene and propylene; conjugated dienes, such as butadiene and isoprene; and vinyl chloride, vinylidene chloride, allyl chloride, and allyl alcohol. These compounds may be used alone, or at least two may be copolymerized.

The main chain of the vinyl polymer (I) is preferably one produced by polymerizing predominantly at least one monomer selected from the group consisting of (meth)acrylic monomers, acrylonitrile monomers, aromatic vinyl monomers, fluorine-containing vinyl monomers and silicon-containing vinyl monomers. The term "predominantly" as used herein means that the above-mentioned monomer accounts for not less than 50 mole percent, preferably not less than 70 mole percent, of the monomer units constituting the vinyl polymer (I).

In particular, from the viewpoint of physical properties of a product, styrene monomers and (meth)acrylic monomers are preferred. Acrylate monomers and methacrylate monomers are more preferred, acrylate monomers are further preferred, and butyl acrylate is further more preferred. In the present invention, these preferred monomers may be copolymerized, e.g., block-copolymerized, with another monomer. In this case, the content by weight of the preferred monomers is preferably 40% by weight or more. In the above expression, the term "(meth)acrylic acid" means acrylic acid and/or methacrylic acid.

In those fields of application where rubber elasticity is required, the vinyl polymer (I) preferably has a glass transition temperature of room temperature or lower than the expected use temperature range, although this is not critical.

The molecular weight distribution [ratio (Mw/Mn) of the weight average molecular weight (Mw) to the number average molecular weight (Mn) determined by gel permeation chromatography (GPC)] of vinyl polymer (I) of the present invention is not particularly limited, but the ratio is preferably less than 1.8, further preferably 1.6 or less, and particularly preferably 1.3 or less. In GPC measurement in the present invention, a number average molecular weight and the like may be generally determined in terms of polystyrene using chloroform as a mobile phase and a polystyrene gel column for measurement.

The number average molecular weight of vinyl polymer (I) of the present invention is not particularly restricted, and preferably in a range of 500 to 1,000,000 and more preferably 5,000 to 50,000 with GPC.

<Method of Main Chain Synthesis>

In accordance with the invention, the method of synthesizing the vinyl polymer (I) is limited to a living radical polymerization technique among controlled radical polymerization techniques, and the atom transfer radical polymerization technique is preferred. This technique is described below.

Controlled Radical Polymerization

Radical polymerization processes are classified into a general radical polymerization process (free radical polymerization) in which a monomer having a specified functional group and a vinyl monomer are simply copolymerized using an azo compound, a peroxide, or the like as a polymerization initiator, and a controlled radial polymerization process in which a specified functional group can be introduced at a controlled position such as an end or the like.

The general radical polymerization process is a simple process, and a monomer having a specified functional group can be introduced into a polymer only stochastically. When a polymer with high functionality is desired, therefore, a considerable amount of a monomer must be used. Conversely, use of a small amount of a monomer has the problem of increasing the ratio of a polymer in which the specified functional group is not introduced. There is also the problem of producing only a polymer with a wide molecular weight distribution and high viscosity due to free radical polymerization.

The controlled radical polymerization process is further classified into a chain transfer agent process in which polymerization is performed using a chain transfer agent having a specified functional group to produce a vinyl polymer having the functional group at an end, and a living radical polymerization process in which polymerization propagation termini propagate without causing termination reaction to produce a polymer having a molecular weight substantially equal to the design.

The chain transfer agent process is capable of producing a polymer with high functionality, but a considerable amount of a chain transfer agent having a specified functional group must be used relative to the initiator, thereby causing an economical problem of the cost including the treatment cost. Like the general radical polymerization process, the chain transfer agent process also has the problem of producing only a polymer with a wide molecular weight distribution and high viscosity because it is free radical polymerization.

It is true that the living radical polymer process belongs to a radical polymerization process which has a high polymerization rate and is difficult to control because termination reaction easily occurs due to radical coupling or the like. However, unlike in the above-mentioned processes, in the living radical polymerization process, termination reaction little occurs, a polymer having a narrow molecular weight distribution (Mw/Mn of about 1.1 to 1.5) can be produced, and the molecular weight can be freely controlled by changing the charge ratio of the monomer to the initiator.

Therefore, the living radical polymerization process is capable of producing a polymer with a narrow molecular weight distribution and low viscosity and introducing a monomer having a specified functional group into a substantially desired position. Thus, this process is more preferred as a process for producing the vinyl polymer having the specified functional group.

In a narrow sense, "living polymerization" means polymerization in which molecular chains propagate while maintaining activity at the termini. However, the living polymerization generally includes pseudo-living polymerization in which molecular chains propagate in equilibrium between deactivated and activated termini. The definition in the present invention includes the latter.

In recent, the living radical polymerization has been actively studied by various groups. Examples of studies include a process using a cobalt porphyrin complex, as shown in Journal of American Chemical Society (J. Am. Chem. Soc.), 1994, vol. 116, p. 7943; a process using a radical scavenger such as a nitroxide compound, as shown in Macromolecules, 1994, vol. 27, p. 7228; and an atom transfer radical polymerization (ATRP) process using an organic halide or the like as an initiator and a transition metal complex as a catalyst.

Among these living radical polymerization processes, the atom transfer radical polymerization process in which a vinyl monomer is polymerized using an organic halide or a halogenated sulfonyl compound as an initiator and a transition metal complex as a catalyst has the above-mentioned characteristics of the living radical polymerization and also has the characteristic that a terminus has a halogen or the like, which is relatively useful for functional group conversion reaction, and the initiator and catalyst have high degrees of design freedom. Therefore, the atom transfer radical polymerization process is more preferred as a process for producing a vinyl polymer having a specified functional group. Examples of the atom transfer radical polymerization process include the processes disclosed in Matyjaszewski, et al., Journal of American Chemical Society (J. Am. Chem. Soc.), 1995, vol. 117, p. 5614; Macromolecules, 1995, vol. 28, p. 7901; Science, 1996, vol. 272, p. 866; WO96/30421, WO97/18247, WO98/01480 and WO98/40415; Sawamoto, et al., Macromolecules, 1995, vol. 28, p. 1721; and Japanese Kokai Publication Hei-09-208616 and Japanese Kokai Publication Hei-08-41117.

In the present invention, any one of these living radical polymerization processes may be used without limitation, but the atom transfer radical polymerization process is preferred.

Hereinafter, the living radical polymerization will be described in detail. First, the controlled radical polymerization process using a chain transfer agent, which may be used in the production of the vinyl polymers mentioned below, will be described. The radical polymerization process using the chain transfer agent (telomer) is not particularly limited, but examples of a process for producing a vinyl polymer having a terminal structure suitable for the present invention include the following two processes:

A process for producing a halogen-terminated polymer using a halogenated hydrocarbon as the chain transfer agent as disclosed in Japanese Kokai Publication Hei-04-132706, and a method for producing a hydroxyl group-terminated polymer using a hydroxyl group-containing mercaptane or a hydroxyl group-containing polysulfide or the like as the chain transfer agent as disclosed in Japanese Kokai Publication Sho-61-271306, Japanese Patent Publication No. 2594402, and Japanese Kokai Publication Sho-54-47782.

Next, the living radical polymerization will be described.

First, the process using a nitroxide compound and the like as a radical capping agent will be described. This polymerization process generally uses stable nitroxy free radical (=N—O.) as a radical capping agent. Preferred examples of such a compound include, but not limited to, nitroxy free radicals produced from cyclic hydroxyamines, such as 2,2,6,6-substituted-1-piperidinyloxy radical and 2,2,5,5-substituted-1-piperidinyloxy radical. As a substituent, an alkyl group having 4 or less carbon atoms, such as methyl or ethyl, is suitable. Specific examples of a nitroxy free radical compound include, but not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical, and N,N-di-tert-butylaminoxy radical. Instead of the nitroxy free radical, stable free radical such as galvinoxyl free radical may be used.

The radical capping agent is used in combination with the radical generator. The reaction product of the radical capping agent and the radical generator possibly servers as a polymerization initiator to promote polymerization of an addition-polymerizable monomer. The ratio between both agents used is not particularly limited, but the amount of the radical generator is preferably 0.1 to 10 moles per mole of the radical capping agent.

As a radical generator, any one of various compounds can be used, but a peroxide capable of generating radical under a polymerization temperature is preferred. Examples of the peroxide include, but not limited to, diacyl peroxides, such as benzoyl peroxide and lauroyl peroxide; dialkyl peroxides, such as dicumyl peroxide and di-tert-butyl peroxide; peroxycarbonates, such as diisopropyl peroxydicarbonate and bis(4-tert-butylcyclohexyl) peroxydicarbonate; and alkyl peresters, such as tert-butyl peroxyoctoate and tert-butyl peroxybenzoate. In particular, benzoyl peroxide is preferred. Instead of the peroxide, a radical generator such as a radical generating azo compound, e.g., azobisisobutyronitrile, may be used.

As reported in Macromolecules, 1995, 28, 2993, the alkoxyamine compound shown below may be used as the initiator instead of a combination of the radical capping agent and the radical generator.

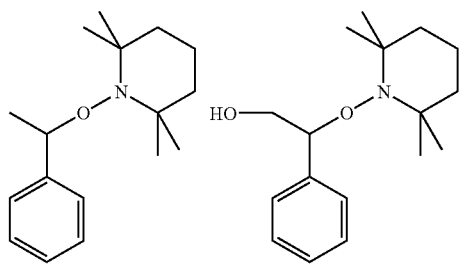

When the alkoxyamine compound is used as the initiator, the use of a compound having a functional group such as a hydroxyl group as shown in the above figure produces a polymer having the functional group at an end. When this compound is used in the method of the present invention, a polymer having the functional group at an end is produced.

The conditions of polymerization using the nitroxide compound as the radical scavenger, such as the monomer, the solvent, the polymerization temperature, and the like, are not limited. However, these conditions may be the same as those in atom transfer radical polymerization which will be described below.

Atom Transfer Radical Polymerization

Next, the atom transfer radical polymerization suitable as the living radical polymerization of the present invention will be described.

The atom transfer radical polymerization uses, as the initiator, an organic halide, particularly an organic halide having a highly reactive carbon-halogen bond (e.g., a carbonyl compound having a halogen at an α-position, or a compound having a halogen at a benzyl position), or a halogenated sulfonyl compound.

Specific examples of such a compound include the following:

$C_6H_5$—$CH_2X$, $C_6H_5$—$C(H)(X)CH_3$, and $C_6H_5$—$C(X)(CH_3)_2$ (wherein $C_6H_5$ is a phenyl group, X is chlorine, bromine, or iodine);
$R^1$—$C(H)(X)$—$CO_2R^2$, $R^1$—$C(CH_3)(X)$—$CO_2R^2$, $R^1$—$C(H)(X)$—$C(O)R^2$, and $R^1$—$C(CH_3)(X)$—$C(O)R^2$ (wherein $R^1$ and $R^2$ are each a hydrogen atom or an alkyl group, an aryl group, or an aralkyl group having 1 to 20 carbon atoms; X is chlorine, bromine, or iodine); and
$R^1$—$C_6H_4$—$SO_2X$ (wherein $R^1$ is a hydrogen atom or an alkyl group, an aryl group, or an aralkyl group having 1 to 20 carbon atoms; X is chlorine, bromine, or iodine).

As the initiator of the atom transfer radical polymerization, an organic halide or halogenated sulfonyl compound having a functional group other than a functional group which initiates polymerization can be used. In this case, the resultant vinyl polymer has the functional group at one of the main chain ends and a polymerization propagation terminal-structure of atom transfer radical polymerization at the other end. Examples of such a functional group include alkenyl, crosslinkable silyl, hydroxyl, epoxy, amino, and amido.

Examples of an organic halide having an alkenyl group include, but not limited to, compounds having the structure represented by formula 2:

(wherein $R^3$ is a hydrogen atom or a methyl group; $R^4$ and $R^5$ are each a hydrogen atom, an alkyl group, an aryl group or an aralkyl group having 1 to 20 carbon atoms, or $R^6$ and $R^7$ are bonded together at the other ends; $R^6$ is —C(O)O— (ester group), —C(O)— (keto group), or an o-, m-, or p-phenylene group; $R^7$ is a direct bond or a divalent organic group having 1 to 20 carbon atoms, which may contain at least one ether bond; and X is chlorine, bromine, or iodine).

Specific examples of substituents $R^4$ and $R^5$ include hydrogen, methyl, ethyl, n-propyl, isopropyl, butyl, pentyl, and hexyl. Substituents $R^4$ and $R^5$ may be bonded together at the other ends to form a cyclic skeleton.

Specific examples of an alkenyl group-containing organic halide represented by formula 2 include the following:
$XCH_2C(O)O(CH_2)_nCH$=$CH_2$,
$H_3CC(H)(X)C(O)O(CH_2)_nCH$=$CH_2$,
$(H_3C)_2C(X)C(O)O(CH_2)_nCH$=$CH_2$,
$CH_3CH_2C(H)(X)C(O)O(CH_2)_nCH$=$CH_2$, and

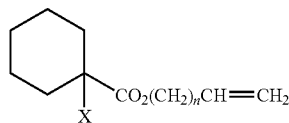

(wherein X is chlorine, bromine, or iodine, and n is an integer of 0 to 20);
$XCH_2C(O)O(CH_2)_nO(CH_2)_mCH$=$CH_2$,
$H_3CC(H)(X)C(O)O(CH_2)_nO(CH_2)_mCH$=$CH_2$,
$(H_3C)_2C(X)C(O)O(CH_2)_nO(CH_2)_mCH$=$CH_2$,
$CH_3CH_2C(H)(X)C(O)O(CH_2)_nO(CH_2)_mCH$=$CH_2$, and

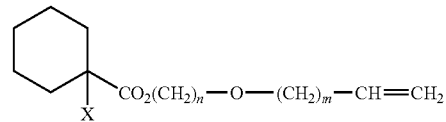

(wherein X is chlorine, bromine, or iodine, n is an integer of 1 to 20, and m is an integer of 0 to 20);
o, m, p-$XCH_2$—$C_6H_4$—$(CH_2)_n$—$CH$=$CH_2$,
o, m, p-$CH_3C(H)(X)$—$C_6H_4$—$(CH_2)_n$—$CH$=$CH_2$, and
o, m, p-$CH_3CH_2C(H)(X)$—$C_6H_4$—$(CH_2)_n$—$CH$=$CH_2$ (wherein X is chlorine, bromine, or iodine, and n is an integer of 0 to 20);
o, m, p-$XCH_2$—$C_6H_4$—$(CH_2)_n$—O—$(CH_2)_m$—$CH$=$CH_2$,
o, m, p-$CH_3C(H)(X)$—$C_6H_4$—$(CH_2)_n$—O—$(CH_2)_m$—$CH$=$CH_2$, and
o, m, p-$CH_3CH_2C(H)(X)$—$C_6H_4$—$(CH_2)_n$—O—$(CH_2)_m$—$CH$=$CH_2$ (wherein X is chlorine, bromine, or iodine, n is an integer of 0 to 20, and m is an integer of 1 to 20);
o, m, p-$XCH_2$—$C_6H_4$—O—$(CH_2)_n$—$CH$=$CH_2$,
o, m, p-$CH_3C(H)(X)$—$C_6H_4$—O—$(CH_2)_n$—$CH$=$CH_2$, and
o, m, p-$CH_3CH_2C(H)(X)$—$C_6H_4$—O—$(CH_2)_n$—$CH$=$CH_2$ (wherein X is chlorine, bromine, or iodine, and n is an integer of 0 to 20); and
o, m, p-$XCH_2$—$C_6H_4$—O—$(CH_2)_n$—O—$(CH_2)_m$—$CH$=$CH_2$,
o, m, p-$CH_3C(H)(X)$—$C_6H_4$—O—$(CH_2)_n$—O—$(CH_2)_m$—$CH$=$CH_2$, and
o, m, p-$CH_3CH_2C(H)(X)$—$C_6H_4$—O—$(CH_2)_n$—O—$(CH_2)_m$—$CH$=$CH_2$ (wherein X is chlorine, bromine, or iodine, n is an integer of 0 to 20, and m is an integer of 1 to 20).

Other examples of an organic halide having an alkenyl group include compounds represented by formula 3:

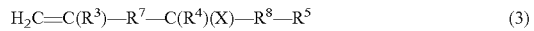

(wherein $R^3$, $R^4$, $R^5$, $R^7$, and X represent the same as the above, and $R^8$ represents a direct bond or —C(O)O— (ester group), —C(O)— (keto group), or an o-, m-, or p-phenylene group).

$R^7$ is a direct bond or a divalent organic group having 1 to 20 carbon atoms (which may contain at least one ether bond) When $R^9$ is a direct bond, the compound is a halogenated allyl compound in which a vinyl group is bonded to the carbon bonded to a halogen. In this case, the carbon-halogen bond is activated by the adjacent vinyl group, and thus a C(O)O or phenylene group is not necessarily required as $R^8$, and a direct bond may be present. When $R^7$ is not a direct bond, $R^8$ is preferably a C(O)O, C(O), or phenylene group for activating the carbon-halogen bond.

Specific examples of the compounds represented by formula 3 include the following:
$CH_2$=$CHCH_2X$, $CH_2$=$C(CH_3)CH_2X$, $CH_2$=$CHC(H)(X)CH_3$,
$CH_2$=$C(CH_3)C(H)(X)CH_3$, $CH_2$=$CHC(X)(CH_3)_2$,
$CH_2$=$CHC(H)(X)C_2H_5$,
$CH_2$=$CHC(H)(X)CH(CH_3)_2$, $CH_2$=$CHC(H)(X)C_6H_5$,
$CH_2$=$CHC(H)(X)CH_2C_6H_5$,
$CH_2$=$CHCH_2C(H)(X)$—$CO_2R^9$, $CH_2$=$CH(CH_2)_2C(H)(X)$—$CO_2R^9$, $CH_2=CH(CH_2)_3C(H)(X)—CO_2R^9$, $CH_2=CH(CH_2)_8C(H)(X)—CO_2R^9$,
$CH_2=CHCH_2C(H)(X)—C_6H_5$, $CH_2=CH(CH_2)_2C(H)(X)—C_6H_5$, and
$CH_2=CH(CH_2)_3C(H)(X)—C_6H_5$ (wherein X is chlorine, bromine, or iodine, and $R^9$ is an alkyl, aryl, or aralkyl having 1 to 20 carbon atoms).

Specific examples of a halogenated sulfonyl compound having an alkenyl group include the following:
o-, m-, p-$CH_2=CH—(CH_2)_n—C_6H_4—SO_2X$, and
o-, m-, p-$CH_2=CH—(CH_2)_n—O—C_6H_4—SO_2X$ (wherein X is chlorine, bromine, or iodine, and n is an integer of 0 to 20).

Specific examples of an organic halide having a crosslinkable silyl group include, but not limited to, compounds with a structure represented by formula 4:

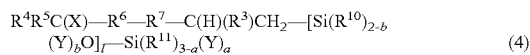

(wherein $R^3$, $R^4$, $R^5$, $R^6$, $R^7$, and X represent the same as the above, and $R^{10}$ and $R^{11}$ each represent an alkyl group having 1 to 20 carbon atoms, an aryl group having 6 to 20 carbon atoms, or an aralkyl having 7 to 20 carbon atoms, or a triorganosiloxy group represented by $(R')_3SiO—$ (the three R's are each a monovalent hydrocarbon group having 1 to 20 carbon atoms and may be the same or different); when two or more groups $R^{10}$ or $R^{11}$ are present, they may be the same or different; Y represents a hydroxyl group or a hydrolyzable group, and when two or more groups Y are present, they may be the same or different; a represents 1, 2, or 3; b represents 0, 1, or 2; l represents an integer of 0 to 19; and $a+lb \geq 1$ is satisfied).

Specific examples of the compounds represented by formula 4 include the following:
$XCH_2C(O)O(CH_2)_nSi(OCH_3)_3$,
$CH_3C(H)(X)C(O)O(CH_2)_nSi(OCH_3)_3$,
$(CH_3)_2C(X)C(O)O(CH_2)_nSi(OCH_3)_3$,
$XCH_2C(O)O(CH_2)_nSi(CH_3)(OCH_3)_2$,
$CH_3C(H)(X)C(O)O(CH_2)_nSi(CH_3)(OCH_3)_2$, and
$(CH_3)_2C(X)C(O)O(CH_2)_nSi(CH_3)(OCH_3)_2$ (wherein X is chlorine, bromine, or iodine, and n is an integer of 0 to 20);
$XCH_2C(O)O(CH_2)_nO(CH_2)_mSi(OCH_3)_3$,
$H_3CC(H)(X)C(O)O(CH_2)_nO(CH_2)_mSi(OCH_3)_3$,
$(H_3C)_2C(X)C(O)O(CH_2)_nO(CH_2)_mSi(OCH_3)_3$,
$CH_3CH_2C(H)(X)C(O)O(CH_2)_nO(CH_2)_mSi(OCH_3)_3$,
$XCH_2C(O)O(CH_2)_nO(CH_2)_mSi(CH_3)(OCH_3)_2$,
$H_3CC(H)(X)C(O)O(CH_2)_nO(CH_2)_m—Si(CH_3)(OCH_3)_2$,
$(H_3C)_2C(X)C(O)O(CH_2)_nO(CH_2)_m—Si(CH_3)(OCH_3)_2$, and
$CH_3CH_2C(H)(X)C(O)O(CH_2)_nO(CH_2)_m—Si(CH_3)(OCH_3)_2$, (wherein X is chlorine, bromine, or iodine, n is an integer of 0 to 20, and m is an integer of 1 to 20); and
o, m, p-$XCH_2—C_6H_4—(CH_2)_2Si(OCH_3)_3$,
o, m, p-$CH_3C(H)(X)—C_6H_4—(CH_2)_2Si(OCH_3)_3$,
o, m, p-$CH_3CH_2C(H)(X)—C_6H_4—(CH_2)_2Si(OCH_3)_3$,
o, m, p-$XCH_2—C_6H_4—(CH_2)_3Si(OCH_3)_3$,
o, m, p-$CH_3C(H)(X)—C_6H_4—(CH_2)_3Si(OCH_3)_3$,
o, m, p-$CH_3CH_2C(H)(X)—C_6H_4—(CH_2)_3Si(OCH_3)_3$,
o, m, p-$XCH_2—C_6H_4—(CH_2)_2—O—(CH_2)_3Si(OCH_3)_3$,
o, m, p-$CH_3C(H)(X)—C_6H_4—(CH_2)_2—O—(CH_2)_3Si(OCH_3)_3$,
o, m, p-$CH_3CH_2C(H)(X)—C_6H_4—(CH_2)_2—O—(CH_2)_3Si(OCH_3)_3$,
o, m, p-$XCH_2—C_6H_4—O—(CH_2)_3Si(OCH_3)_3$,
o, m, p-$CH_3C(H)(X)—C_6H_4—O—(CH_2)_3Si(OCH_3)_3$,
o, m, p-$CH_3CH_2C(H)(X)—C_6H_4—O—(CH_2)_3—Si(OCH_3)_3$,
o, m, p-$XCH_2—C_6H_4—O—(CH_2)_2—O—(CH_2)_3—Si(OCH_3)_3$,
o, m, p-$CH_3C(H)(X)—C_6H_4—O—(CH_2)_2—O—(CH_2)_3Si(OCH_3)_3$, and
o, m, p-$CH_3CH_2C(H)(X)—C_6H_4—O—(CH_2)_2—O—(CH_2)_3Si(OCH_3)_3$ (wherein X is chlorine, bromine, or iodine).

Other examples of the organic halide having a crosslinkable silyl group include compounds with a structure represented by formula 5:

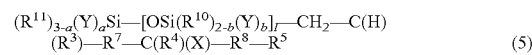

(wherein $R^3$, $R^4$, $R^5$, $R^7$, $R^8$, $R^{10}$, $R^{11}$, a, b, l, X and Y represent the same as the above).

Specific examples of such compounds include the following:
$(CH_3O)_3SiCH_2CH_2C(H)(X)C_6H_5$,
$(CH_3O)_2(CH_3)SiCH_2CH_2C(H)(X)C_6H_5$,
$(CH_3O)_3Si(CH_2)_2C(H)(X)—CO_2R^9$,
$(CH_3O)_2(CH_3)Si(CH_2)_2C(H)(X)—CO_2R^9$,
$(CH_3O)_3Si(CH_2)_3C(H)(X)—CO_2R^9$,
$(CH_3O)_2(CH_3)Si(CH_2)_3C(H)(X)—CO_2R^9$,
$(CH_3O)_3Si(CH_2)_4C(H)(X)—CO_2R^9$,
$(CH_3O)_2(CH_3)Si(CH_2)_4C(H)(X)—CO_2R^9$,
$(CH_3O)_3Si(CH_2)_9C(H)(X)—CO_2R^9$,
$(CH_3O)_2(CH_3)Si(CH_2)_9C(H)(X)—CO_2R^9$,
$(CH_3O)_3Si(CH_2)_3C(H)(X)—C_6H_5$,
$(CH_3O)_2(CH_3)Si(CH_2)_3C(H)(X)—C_6H_5$,
$(CH_3O)_3Si(CH_2)_4C(H)(X)—C_6H_5$, and
$(CH_3O)_2(CH_3)Si(CH_2)_4C(H)(X)—C_6H_5$ (wherein X is chlorine, bromine, or iodine, and $R^9$ is alkyl, aryl, or aralkyl having 1 to 20 carbon atoms).

Examples of the hydroxyl group-containing organic halide or halogenated sulfonyl compound include, but not limited to, the following:

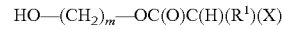

(wherein X is chlorine, bromine, or iodine, $R^1$ is a hydrogen atom or alkyl, aryl, or aralkyl having 1 to 20 carbon atoms, and m is an integer of 1 to 20).

Examples of the amino group-containing organic halide or halogenated sulfonyl compound include, but not limited to, the following:

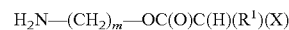

(wherein X is chlorine, bromine, or iodine, $R^1$ is a hydrogen atom or alkyl, aryl, or aralkyl having 1 to 20 carbon atoms, and m is an integer of 1 to 20).

Examples of the epoxy group-containing organic halide or halogenated sulfonyl compound include, but not limited to, the following:

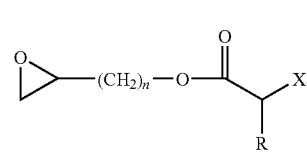

(wherein X is chlorine, bromine, or iodine, R is a hydrogen atom or alkyl, aryl, or aralkyl having 1 to 20 carbon atoms, and m is an integer of 1 to 20).

In order to obtain a polymer having at least two polymerization propagation terminal structures per molecule, an organic halide or halogenated sulfonyl compound having at least two initiation points is preferably used as the initiator. Examples of such a compound include the following:

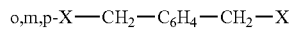

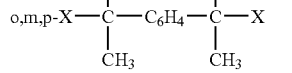

(wherein $C_6H_4$ is a phenylene group, and X is chlorine, bromine, or iodine.)

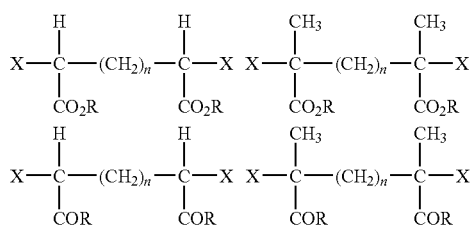

(wherein R is an alkyl, aryl, or aralkyl group having 1 to 20 carbon atoms, n is an integer of 0 to 20, and X is chlorine, bromine, or iodine.)

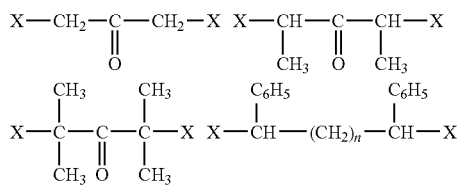

(wherein X is chlorine, bromine, or iodine, and n is an integer of 0 to 20.)

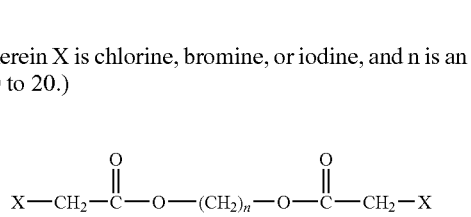

(wherein n is an integer of 1 to 20, and X is chlorine, bromine, or iodine.)

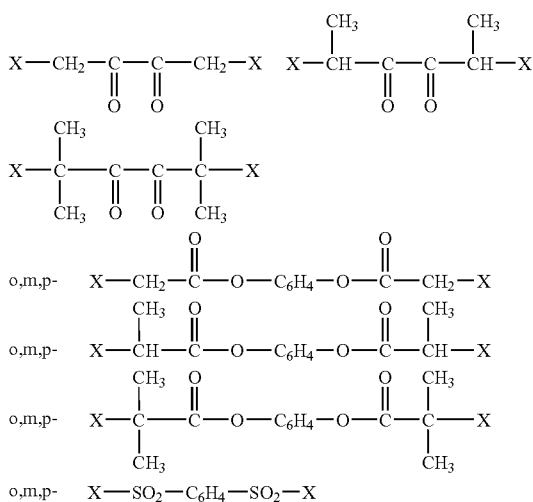

(wherein X is chlorine, bromine, or iodine.)

The vinyl monomer used in the polymerization is not particularly limited, and any of the compounds listed above can be preferably used.

The transition metal complex used as the polymerization catalyst is not particularly limited, but a transition metal complex composed of a VII, VIII, IX, X, or XI group element in the periodic table as a central metal is preferred. A complex of zero-valent copper, monovalent copper, divalent ruthenium, divalent iron, or divalent nickel is more preferred. Among these complexes, a copper complex is most preferred. Specific examples of a monovalent copper compound include cuprous chloride, cuprous bromide, cuprous iodide, cuprous cyanide, cuprous oxide, and cuprous perchlorate. When a copper compound is used, a ligand, such as 2,2'-bipyridyl or its derivative, 1,10-phenanthroline or its derivative, or polyamine, e.g., tetramethylethylenediamine, pentamethyldiethylenetriamine, or hexamethyl tris(2-aminoethyl) amine, is added for increasing catalyst activity. As a ligand, nitrogen-containing compounds are preferred, chelate nitrogen compounds are more preferred, N,N,N',N'',N''-pentamethyldiethylenetriamine is further preferred. Also, a tristriphenylphosphine complex ($RuCl_2(PPh_3)_3$) of divalent ruthenium chloride is suitable as the catalyst. When a ruthenium compound is used, an aluminum alkoxide is added as an activator. Furthermore, a bistriphenylphosphine complex ($FeCl_2(PPh_3)_2$) of divalent iron, a bistriphenylphosphine complex ($NiCl_2(PPh_3)_2$) of divalent nickel, or a bistributylphosphine complex ($NiBr_2(PBu_3)_2$) of divalent nickel is preferred as the catalyst.

The polymerization can be performed without a solvent or in any of various solvents. Examples of the solvent include hydrocarbon solvents, such as benzene and toluene; ether solvents, such as diethyl ether and tetrahydrofuran; halogenated hydrocarbon solvents, such as methylene chloride and chloroform; ketone solvents, such as acetone, methyl ethyl ketone, and methyl isobutyl ketone; alcohol solvents, such as methanol, ethanol, propanol, isopropanol, n-butyl alcohol, and tert-butyl alcohol; nitrile solvents, such as acetonitrile, propionitrile, and benzonitrile; ester solvents, such as ethyl acetate and butyl acetate; and carbonate solvents, such as ethylene carbonate and propylene carbonate. These solvents can be used alone or as a mixture of two or more.

The polymerization can be performed in a range of 0° C. to 200° C., and preferably 50° C. to 150° C. without any purpose of restriction.

The atom transfer radical polymerization of the invention includes so called reverse atom transfer radical polymerization. The reverse atom transfer radical polymerization is a method comprising reacting an ordinary atom transfer radical polymerization catalyst in its high oxidation state resulting from radical generation, for example Cu(II') when Cu(I) is used as the catalyst, with an ordinary radical initiator, such as a peroxide, to thereby bring about an equilibrium state like in atom transfer radical polymerization (cf. Macromolecules, 1999, 32, 2872).

<Functional Groups>

Number of Crosslinkable Silyl Groups

The vinyl polymer (I) has at least one crosslinkable silyl groups. The number of crosslinkable silyl groups is, from the viewpoint of the curability of the composition and/or the physical properties of the cured product, preferably not smaller than 1.1 but not greater than 4.0, more preferably not smaller than 1.2 but not greater than 3.5.

Positions of Crosslinkable Silyl Groups

In cases where the cured products resulting from curing of the curable composition of the present invention are especially required to have rubber-like properties, it is preferred that at least one of crosslinkable silyl groups be positioned at a terminus of the main chain (the molecular chain) so that the molecular weight between crosslinking sites, which has a great influence on the rubber elasticity, can be increased. More preferably, all crosslinkable groups are located at molecular chain termini.

Methods of producing vinyl polymers (I), in particular (meth)acrylic polymers, having at least one crosslinkable silyl group such as mentioned above at a molecular terminus thereof are disclosed in Japanese Kokoku Publication Hei-03-14068, Japanese Kokoku Publication Hei-04-55444 and Japanese Kokai Publication Hei-06-211922, among others. However, these methods are free radical polymerization methods in which the above-mentioned "chain transfer agent methods" is used and, therefore, the polymers obtained generally have problems, namely they show a molecular weight distribution represented by Mw/Mn as wide as not less than 2 as well as a high viscosity, although they have crosslinkable functional groups, in relatively high proportions, at molecular chain termini. Therefore, for obtaining vinyl polymers showing a narrow molecular weight distribution and a low viscosity and having crosslinkable functional groups, in high proportions, at molecular chain termini, the above-described "living radical polymerization method" is preferably used.

In the following, an explanation is made of these functional groups.

Crosslinkable Silyl Groups

As the crosslinkable silyl groups of vinyl polymers (I) to be used in the practice of the present invention, there may be mentioned those groups represented by the general formula 1:

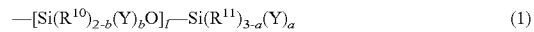

{wherein, $R^{10}$ and $R^{11}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a univalent hydrocarbon group containing 1 to 20 carbon atoms and the three R' groups may be the same or different) and, when there are two or more $R^{10}$ or $R^{11}$ groups, they may be the same or different; Y represents a hydroxyl group or a hydrolyzable group and, when there are two or more Y groups, they may be the same or different; a represents 1, 2 or 3, b represents 0, 1 or 2, and l is an integer of 0 to 19, provided that the relation a+lb≧1 should be satisfied.}

As the hydrolyzable group, there may be mentioned, among others, a hydrogen atom and those groups which are in general use, for example alkoxy, acyloxy, ketoximate, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydrolyzable groups and/or hydroxyl groups can be bound to each silicon atom and, in the practice of the present invention, it is preferred that (a+Σb) be within the range of 1 to 5. When there are two or more hydrolyzable groups or hydroxyl groups in one crosslinkable silyl group, they may be the same or different. The number of silicon atoms forming the crosslinkable silyl group is not less than 1 and, in the case of silicon atoms connected by siloxane or like bonding, it is preferably not more than 20. Particularly preferred are crosslinkable silyl groups represented by the general formula 7:

(wherein $R^{11}$, Y and a are as defined above) because of ready availability.

Considering the curability, the integer a is preferably 2 or more, though this is not critical. One in which a is 3 (e.g. trimethoxy functional group) is faster in curability than one in which a is 2 (e.g. dimethoxy functional group) but, as for the storage stability and/or mechanical properties (e.g. elongation), one in which a is 2 is sometimes superior. For attaining a balance between curability and physical properties, one in which a is 2 (e.g. dimethoxy functional group) and one in which a is 3 (e.g. trimethoxy functional group) may be used in combination.

<Silyl Group Introduction Method>

In the following, several methods of silyl group introduction into the vinyl polymer (I) of the present invention are described without any purpose of restriction.

As methods of synthesizing vinyl polymers (I) having at least one crosslinkable silyl group, there may be mentioned, among others, (A) the method which comprises subjecting a crosslinkable silyl group-containing hydrosilane compound to addition to a vinyl polymer having at least one alkenyl group in the presence of a hydrosilylation catalyst, (B) the method which comprises reacting a vinyl polymer having at least one hydroxyl group with a compound having, in each molecule, a crosslinkable silyl group and a group capable of reacting with the hydroxyl group, such as an isocyanato group, (C) the method which comprises subjecting a compound having, in each molecule, a polymerizable alkenyl group and a crosslinkable silyl group to reaction in synthesizing a vinyl polymer by radical polymerization, and (E) the method which comprises reacting a vinyl polymer having at least one highly reactive carbon-halogen bond with a compound having, in each molecule, a crosslinkable silyl group and a stable carbanion.

The vinyl polymer having at least one alkenyl group, which is to be used in the above method (A), can be obtained by various methods. Several methods of synthesis are mentioned below, without any purpose of restriction, however.

(A-a) Method comprising subjecting to reaction a compound having, in each molecule, a polymerizable alkenyl group together with a low polymerizability alkenyl group, such as one represented by the general formula 8 shown below as a second monomer in synthesizing a vinyl polymer by radical polymerization:

$$H_2C=C(R^{14})-R^{15}-R^{16}-C(R^{17})=CH_2 \quad (8)$$

(wherein $R^{14}$ represents a hydrogen atom or a methyl group, $R^{15}$ represents —C(O)O— or an o-, m- or p-phenylene group, $R^{16}$ represents a direct bond or a divalent organic group containing 1 to 20 carbon atoms, which may contain one or more ether bonds, and $R^{17}$ represents a hydrogen atom, an alkyl group containing 1 to 20 carbon atoms, an aryl group containing 6 to 20 carbon atoms or an aralkyl group containing 7 to 20 carbon atoms).

The time when the compound having, in each molecule, a polymerizable alkenyl group together with a low polymerizability alkenyl group is subjected to reaction is not particularly restricted but, in particular in living radical polymerization and when rubber-like properties are expected, the compound is preferably subjected to reaction as a second monomer at the final stage of the polymerization reaction or after completion of the reaction of the employed monomers.

(A-b) Method comprising subjecting to reaction a compound having at least two low polymerizability alkenyl groups, for example 1,5-hexadiene, 1,7-octadiene or 1,9-decadiene, at the final stage of the polymerization or after completion of the reaction of the monomers employed in vinyl polymer synthesis by living radical polymerization.

(A-c) Method comprising reacting a vinyl polymer having at least one highly reactive carbon-halogen bond with one of various alkenyl-containing organometallic compounds, for example an organotin such as allyltributyltin or allyltrioctyltin, for substitution of the halogen.

(A-d) Method comprising reacting a vinyl polymer having at least one highly reactive carbon-halogen bond with a stabilized, alkenyl-containing carbanion such as one represented by the general formula 9, for substitution of the halogen:

$$M^+C^-(R^{18})(R^{19})-R^{20}-C(R^{17})=CH_2 \quad (9)$$

(wherein $R^{17}$ is as defined above, $R^{18}$ and $R^{19}$ each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{20}$ represents a direct bond or a divalent organic group containing 1 to 10 carbon atoms, which may contain one or more ether bonds, and $M^+$ represents an alkali metal ion or a quaternary ammonium ion).

Particularly preferred as the electron-withdrawing group $R^{18}$ and/or $R^{19}$ are those which have a structure of —$CO_2R$, —C(O)R or —CN.

(A-e) Method comprising reacting a vinyl polymer having at least one highly reactive carbon-halogen bond with a simple substance metal, such as zinc, or an organometallic compound and then reacting the thus-prepared enolate anion with an alkenyl-containing, electrophilic compound, such as an alkenyl-containing compound having a leaving group such as a halogen atom or an acetyl group, an alkenyl-containing carbonyl compound, an alkenyl-containing isocyanate compound or an alkenyl-containing acid halide.

(A-f) Method comprising reacting a vinyl polymer having at least one highly reactive carbon-halogen bond with an alkenyl-containing oxy anion or carboxylate anion such as one represented by the general formula (10) or (11), for substitution of the halogen:

$$H_2C=C(R^{17})-R^{21}-O^-M^+ \quad (10)$$

(wherein $R^{17}$ and $M^+$ are as defined above and $R^{21}$ is a divalent organic group containing 1 to 20 carbon atoms, which may contain one or more ether bonds);

$$H_2C=C(R^{17})-R^{22}-C(O)O^-M^+ \quad (11)$$

(wherein $R^{17}$ and $M^+$ are as defined above and $R^{22}$ is a direct bond or a divalent organic group containing 1 to 20 carbon atoms, which may contain one or more ether bonds).

The method of synthesizing the above-mentioned vinyl polymer having at least one highly reactive carbon-halogen bond includes, but is not limited to, atom transfer radical polymerization methods using an organic halide or the like as initiator and a transition metal complex as catalyst, as mentioned above.

It is also possible to obtain the vinyl polymer having at least one alkenyl group from a vinyl polymer having at least one hydroxyl group. As utilizable methods, there may be mentioned, for example, the following, without any purpose of restriction.

(A-g) Method comprising reacting the hydroxyl group of a vinyl polymer having at least one hydroxyl group with a base, such as sodium methoxide, followed by reaction with an alkenyl-containing halide, such as allyl chloride.

(A-h) Method comprising reacting such hydroxyl group with an alkenyl-containing isocyanate compound, such as allyl isocyanate.

(A-i) Method comprising reacting such hydroxyl group with an alkenyl-containing acid halide, such as (meth)acrylic acid chloride, in the presence of a base, such as pyridine.

(A-j) Method comprising reacting such hydroxyl group with an alkenyl-containing carboxylic acid, such as acrylic acid, in the presence of an acid catalyst.

In the practice of the present invention, when no halogen is directly involved in the alkenyl group introduction, as in the method (A-a) or (A-b), the vinyl polymer is preferably synthesized by living radical polymerization. From the viewpoint of ready controllability, the method (A-b) is more preferred.

In cases where alkenyl group introduction is effected by conversion of the halogen atom of a vinyl polymer having at least one highly reactive carbon-halogen atom, use is preferably made of a vinyl polymer having at least one terminal carbon-halogen bond, which is highly reactive, as obtained by subjecting a vinyl monomer to radical polymerization (atom transfer radical polymerization) using, as an initiator, an organic halide or halogenated sulfonyl compound having at least one highly reactive carbon-halogen bond and, as a catalyst, a transition metal complex. In view of easier controllability, the method (A-f) is more preferred.

The crosslinkable silyl group-containing hydrosilane compound is not particularly restricted but includes, as typical examples, compounds represented by the general formula 12 given below.

$$H-[Si(R^{10})_{2-b}(Y)_bO]_r-Si(R^{11})_{3-a}(Y)_a \quad (12)$$

{wherein $R^{10}$ and $R^{11}$ each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— (in which R' is a univalent hydrocarbon group containing 1 to 20 carbon atoms and the three R' groups may be the same or different) and, when there are two or more $R^{10}$ or $R^{11}$ groups, they may be the same or different; Y represents a hydroxyl group or a hydrolyzable group and, when there are two or more Y groups, they may be the same or different; a represents 1, 2 or 3, b represents 0, 1 or 2 and l is an integer of 0 to 19, provided that the relation a+lb≧1 should be satisfied}.

Particularly preferred among those hydrosilane compounds in view of ready availability are crosslinkable group-containing compounds represented by the general formula 13:

(wherein $R^{11}$, Y a are as defined above).

In subjecting the above crosslinkable silyl-containing hydrosilane compound to addition to the alkenyl group, a transition metal catalyst is generally used. The transition metal catalyst includes, among others, simple substance platinum, solid platinum dispersed on a support such as alumina, silica or carbon black, chloroplatinic acid, chloroplatinic acid complexes with alcohols, aldehydes, ketones or the like, platinum-olefin complexes, and platinum(0)-divinyltetramethyldisiloxane complex. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$, for instance.

The method of producing the vinyl polymer having at least one hydroxyl group, which polymer is to be used in the methods (B) and (A-g) to (A-j), includes, but is not limited to, the following, among others.

(B-a) Method comprising subjecting to reaction, as a second monomer, a compound having both a polymerizable alkenyl group and a hydroxyl group in each molecule, for example one represented by the general formula 14 given below, in synthesizing the vinyl polymer by radical polymerization:

(wherein $R^{14}$, $R^{15}$ and $R^{16}$ are as defined above).

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the employed monomer.

(B-b) Method comprising subjecting an alkenyl alcohol, such as 10-undecenol, 5-hexenol or allyl alcohol, to reaction at the final stage of polymerization reaction or after completion of the reaction of the employed monomer in synthesizing the vinyl polymer by living radical polymerization.

(B-c) Method comprising radical-polymerizing a vinyl monomer using a hydroxyl-containing chain transfer agent, such as a hydroxyl-containing polysulfide, in large amounts, as described in Japanese Kokai Publication Hei-05-262808, for instance.

(B-d) Method comprising subjecting a vinyl monomer to radical polymerization using hydrogen peroxide or a hydroxyl-containing initiator, as described in Japanese Kokai Publication Hei-06-239912 and Japanese Kokai Publication Hei-08-283310, for instance.

(B-e) Method comprising subjecting a vinyl monomer to radical polymerization using an alcohol in excess, as described in Japanese Kokai Publication Hei-06-116312, for instance.

(B-f) Method comprising introducing a terminal hydroxyl group by hydrolyzing the halogen atom of a vinyl polymer having at least one highly reactive carbon-halogen bond or reacting such halogen atom with a hydroxyl-containing compound, according to the method described in Japanese Kokai Publication Hei-04-132706, for instance.

(B-g) Method comprising reacting a vinyl polymer having at least one highly reactive carbon-halogen bond with a hydroxyl-containing stabilized carbanion, such as one represented by the general formula 15 for substitution of the halogen atom:

(wherein $R^{18}$, $R^{19}$ and $R^{20}$ are as defined above).

Particularly preferred as the electron-withdrawing groups $R^{18}$ and $R^{19}$ are those having a structure of $-CO_2R$, $-C(O)R$ or $-CN$.

(B-h) Method comprising reacting a vinyl polymer having at least one highly reactive carbon-halogen bond with a simple substance metal, such as zinc, or an organometallic compound and then reacting the thus-prepared enolate anion with an aldehyde or ketone.

(B-i) Method comprising reacting a vinyl polymer having at least one highly reactive carbon-halogen bond with a hydroxyl-containing oxy anion or carboxylate anion, such as one represented by the general formula 16 or 17 given below, for substitution of the halogen atom:

(wherein $R^{21}$ and $M^+$ are as defined above);

(wherein $R^{22}$ and $M^+$ are as defined above).

(B-j) Method comprising subjecting, as a second monomer, a compound having a low polymerizable alkenyl group and a hydroxyl group in each molecule to reaction at the final stage of the polymerization reaction or after completion of the reaction of the employed monomer in synthesizing the vinyl polymer by living radical polymerization.

Such compound is not particularly restricted but may be a compound represented by the general formula 18, for instance:

(wherein $R^{14}$ and $R^{21}$ are as defined above).

The compound represented by the above general formula 18 is not particularly restricted but, in view of ready availability, alkenyl alcohols such as 10-undecenol, 5-hexenol and allyl alcohol are preferred.

In the practice of the present invention, when no halogen is directly involved in hydroxyl group introduction, as in the methods (B-a) to (B-e) and (B-j), the vinyl polymer is preferably synthesized by living radical polymerization. The method (B-b) is more preferred from the viewpoint of ease of control.

In cases where hydroxyl group introduction is effected by conversion of the halogen atom of a vinyl polymer having at least one highly reactive carbon-halogen atom, use is preferably made of a vinyl polymer having at least one terminal carbon-halogen bond, which is highly reactive, as obtained by subjecting a vinyl monomer to radical polymerization (atom transfer radical polymerization) using an organic halide or halogenated sulfonyl compound as an initiator and, as a catalyst, a transition metal complex. From the viewpoint of ease of control, the method (B-i) is more preferred.

As the compound having a crosslinkable silyl group and a group capable of reacting with a hydroxyl group, such as an isocyanato group, in each molecule, there may be mentioned, for example, γ-isocyanatopropyltrimethoxysilane, γ-isocyanatopropylmethyldimethoxysilane, γ-isocyanatopropyltriethoxysilane and the like. If necessary, any of urethane formation reaction catalysts generally known in the art can be used.

The compound having both a polymerizable alkenyl group and a crosslinkable silyl group in each molecule, which is to be used in the method (C), includes, among others, γ-trimethoxysilylpropyl (meth)acrylate, γ-methyldimethoxysilylpropyl (meth)acrylate and like compounds represented by the general formula 19:

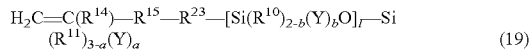
(19)

(wherein $R^{10}$, $R^{11}$, $R^{14}$, $R^{15}$, Y, a, b and l are as defined above and $R^{23}$ is a direct bond or a divalent organic group containing 1 to 20 carbon atoms, which may contain one or more ether bonds, provided that the relation a+lb≧1 should be satisfied).

The time for subjecting the compound having both a polymerizable alkenyl group and a crosslinkable silyl group in each molecule is not critical but, in particular in living radical polymerization and when rubber-like properties are demanded, the compound is preferably subjected to reaction as a second monomer at the final stage of the polymerization reaction or after completion of the reaction of the employed monomer.

The method of synthesizing the vinyl polymer having at least one highly reactive carbon-halogen bond, which is to be used in the method (E), includes, but is not limited to, the atom transfer radical polymerization method which uses an organic halide or the like as an initiator and a transition metal complex as a catalyst. As the compound having both a crosslinkable silyl group and a stabilized carbanion in each molecule, there may be mentioned compounds represented by the general formula 20:

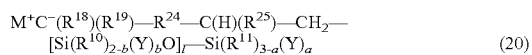
(20)

(wherein $R^{10}$, $R^{11}$, $R^{18}$, $R^{19}$, Y, a, b, l and $M^+$ are as defined above, $R^{24}$ is a direct bond or a divalent organic group containing 1 to 10 carbon atoms, which may contain one or more ether bonds, and $R^{25}$ represents a hydrogen atom, an alkyl group containing 1 to 10 carbon atoms, an aryl group containing 6 to 10 carbon atoms or an aralkyl group containing 7 to 10 carbon atoms, provided that the relation a+lb≧1 should be satisfied).

Particularly preferred as the electron-withdrawing groups $R^{18}$ and $R^{19}$ are those having a structure of —$CO_2R$, —C(O)R or —CN.

<<Antioxidant (II)>>

As specific examples of antioxidants, there may be mentioned, but not restricted to, for example, thioethers such as Adekastab PEP-36 and Adekastab AO-23 (both being products of Asahi Denka Co., Ltd.), phosphorus-containing antioxidants such as IRGAFOS 38, IRGAFOS 168 and IRGAFOS P-EPQ (the three being products of Ciba Specialty Chemicals), hindered phenol type antioxidants, and the like. For example, such hindered phenol compounds as enumerated below are preferred.

As specific examples of the hindered phenol compounds, the following can be mentioned.

2,6-Di-tert-butyl-4-methylphenol, 2,6-di-tert-butyl-4-ethylphenol, mono(or di or tri)(α-methylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amylhydroquinone, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], 2,4-bis(n-octylthio)-6-(4-hydroxy-3,5-di-tert-butylanilino)-1,3,5-triazine, pentaerythrityl tetrakis[3-(3,5-di-tert-butyl-4-hydroxyphenyl)propionate], 2,2-thiodiethylenebis[3-(3,5-di-tert-butyl-4-hydroxyphenyl) propionate], octadecyl-3-(3,5-di-tert-butyl-4-hydroxyphenyl)propionate, N,N'-hexamethylenebis (3,5-di-tert-butyl-4-hydroxyhydrocinnamide), diethyl 3,5-di-tert-butyl-4-hydroxybenzylphosphonate, 1,3,5-trimethyl-2,4,6-tris (3,5-di-tert-butyl-4-hydroxybenzyl)benzene, bis(ethyl 3,5-di-tert-butyl-4-hydroxybenzylphosphonato)calcium, tris(3,5-di-tert-butyl-4-hydroxybenzyl)isocyanurate, 2,4-bis[(octylthio)methyl]-o-cresol, N,N'-bis[3-(3,5-di-tert-butyl-4-hydroxyphenyl)propionyl]hydrazine, tris(2,4-di-tert-butylphenyl)phosphite, 2-(5-methyl-2-hydroxyphenyl)benzotriazole, 2-[2-hydroxy-3,5-bis(α,α-dimethylbenzyl)phenyl]-2H-benzotriazole, 2-(3,5-di-tert-butyl-2-hydroxyphenyl)benzotriazole, 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2-(3,5-di-tert-amyl-2-hydroxyphenyl)benzotriazole, 2-(2'-hydroxy-5'-tert-octylphenyl)benzotriazole, methyl 3-[3-tert-butyl-5-(2H-benzotriazol-2-yl)-4-hydroxyphenyl]propionate-polyethylene glycol (molecular weight about 300) condensate, hydroxyphenylbenzotriazole derivatives, bis(1,2,2,6,6-pentamethyl-4-piperidyl) 2-(3,5-di-tert-butyl-4-hydroxybenzyl)-2-n-butylmalonate, 2,4-di-tert-butylphenyl-3,5-di-tert-butyl-4-hydroxybenzoate, and the like.

Examples of the relevant product names include, but are not limited to, Nocrac 200, Nocrac M-17, Nocrac SP, Nocrac SP-N, Nocrac NS-5, Nocrac NS-6, Nocrac NS-30, Nocrac 300, Nocrac NS-7 and Nocrac DAH (all being products of Ouchi Shinko Chemical Industrial Co., Ltd.), Adekastab AO-30, Adekastab AO-40, Adekastab AO-50, Adekastab AO-60, Adekastab AO-616, Adekastab AO-635, Adekastab AO-658, Adekastab AO-80, Adekastab AO-15, Adekastab AO-18, Adekastab 328 and Adekastab AO-37 (all being products of Asahi Denka Co., Ltd.), IRGANOX 245, IRGANOX 259, IRGANOX 565, IRGANOX 1010, IRGANOX 1024, IRGANOX 1035, IRGANOX 1076, IRGANOX 1081, IRGANOX 1098, IRGANOX 1222, IRGANOX 1330 and IRGANOX 1425WL (all being products of Ciba Specialty Chemicals), and Sumilizer GM and Sumilizer GA-80 (both being products of Sumitomo Chemical Co., Ltd.).

<<Plasticizer (III)>>

One or more of plasticizers (III) may be incorporated in the curable composition of the invention. The use of a plasticizer in combination with a filler, which is described later herein, can make it possible to increase the elongation of cured products and/or incorporate a large amount of a filler in the curable composition, hence is advantageous. The plasticizers are not particularly restricted but may be selected from among the following ones according to the purpose of adjusting physical and other properties: phthalate esters such as dibutyl phthalate, diheptyl phthalate, di(2-ethylhexyl)phthalate, diisononyl phthalate, diisodecyl phthalate, diisoundecyl phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; polyalkylene glycol esters such as diethylene glycol dibenzoate, triethylene glycol dibenzoate and pentaerythritol esters; phosphate esters such as tricresyl phosphate and tributyl phosphate; trimellitate esters; polystyrenes such as polystyrene and poly-α-methylstyrene; polybutadiene, polybutene, polyisobutylene, butadiene-acrylontirile copolymers, polychloroprene; chlorinated paraffins; alkyldiphenyls, partially hydrogenated terphenyl and like hydrocarbon oils; process oils; polyethers including polyether polyols such as polyethylene glycol, polypropylene glycol and polytetramethylene glycol and derivatives of such polyether polyols as resulting from conversion of the hydroxyl group(s) thereof to an ester group, an ether group or like group; epoxy plasticizers such as epoxidized soybean oil and benzyl epoxystearate; polyester type plasticizers obtained from a dibasic acid such as sebacic acid, adipic acid, azelaic acid or phthalic acid and a dihydric alcohol such as ethylene glycol, diethylene glycol, triethylene glycol, propylene glycol or dipropylene glycol; acrylic plasticizers; other vinyl polymers obtained by polymerizing a vinyl monomer(s) by various methods of polymerization; and the like.

Preferred are polyoxyalkylene polymers including polyether polyols such as polyethylene glycol, polypropylene glycol and polytetramethylene glycol and derivatives of such polyether polyols as resulting from conversion of the hydroxyl group(s) thereof to an ester group, an ether group or like group, and phthalate esters.

By adding a high-molecular-weight plasticizer, which is a polymer having a number average molecular weight of 500 to 15,000, it becomes possible to adjust the viscosity and/or slump tendency of the curable composition as well as the mechanical properties, such as tensile strength and elongation, of the cured products obtained by curing that composition and, further, as compared with the cases where a low-molecular-weight plasticizer containing no polymer component within the molecule is used, it becomes possible to maintain the initial physical properties for a long period of time. In the case of outdoor and the like use, plasticizer bleeding out onto the surface is prevented and, accordingly, dust hardly adhere to the surface and, also in the case of application of a paint or the like to the surface of the curable composition, coat film softening or coat film staining resulting therefrom hardly occurs and, therefore, the beautiful view can be maintained for a long period of time. This high-molecular-weight plasticizer may have a functional group(s) or may not have any functional group, without any limitation.

The number average molecular weight of the above-mentioned high-molecular-weight plasticizer, which may be within the range of 500 to 15,000, as mentioned above, is preferably 800 to 10,000, more preferably 1,000 to 8,000. When the molecular weight is too low, the plasticizer will flow out upon exposure to heat and/or rain with the lapse of time, failing to maintain the initial physical properties for a long period of time. When the molecular weight is excessively high, the viscosity increases, and the workability tends to deteriorate.

Among these high-molecular-weight plasticizers, vinyl polymers may be used from the viewpoint of compatibility, weather resistance and heat resistance. Among vinyl polymers, (meth)acrylic polymers are preferred and acrylic polymers are further preferred. These acrylic polymers include, among others, conventional ones obtainable by solution polymerization, solventless acrylic polymers and the like. The latter acrylic plasticizers are more suited for the purpose of the present invention since they are produced by high-temperature continuous polymerization techniques (U.S. Pat. No. 4,414,370, Japanese Kokai Publication Sho-59-6207, Japanese Kokoku Publication Hei-05-58005, Japanese Kokai Publication Hei-01-313522, U.S. Pat. No. 5,010,166), without using any solvent or chain transfer agent. Examples thereof are not particularly restricted but include, among others, ARUFON UP-1000, UP-1020, UP-1110 and the like (these three are products of Toagosei Co., Ltd.), JDX-P1000, JDX-P1010, JDX-P1020 and the like (these three are products of Johnson Polymer Corporation), and the like. Mention may of course be made of the living radical polymerization technique as another method of synthesis. This technique is preferred, since it can give polymers with a narrow molecular weight distribution and a reduced viscosity and, furthermore, the atom transfer radical polymerization technique is more preferred, although the polymerization technique is not limited to those mentioned above.

As the high-molecular-weight plasticizers, polyoxyalkylene polymer is preferably used from the viewpoint of cost, weather resistance, and low residual tack of the cured product surface. The polyoxyalkylene polymer is described in such patent documents as Japanese Kokoku Publication Sho-45-36319, Japanese Kokoku Publication Sho-46-12154, Japanese Kokoku Publication Sho-49-32673, Japanese Kokai Publication Sho-50-156599, Japanese Kokai Publication Sho-51-73561, Japanese Kokai Publication Sho-54-6096, Japanese Kokai Publication Sho-55-82123, Japanese Kokai Publication Sho-55-123620, Japanese Kokai Publication Sho-55-125121, Japanese Kokai Publication Sho-55-131022, Japanese Kokai Publication Sho-55-135135 and Japanese Kokai Publication Sho-55-137129.

Preferably, the molecular chain of the polyoxyalkylene polymer is essentially constituted of a repeating unit represented by the general formula:

$$-R^{26}-O-$$

(wherein $R^{26}$ is a bivalent organic group). $R^{26}$ is preferably a bivalent hydrocarbon group containing 3 to 6 carbon atoms, more preferably mostly a hydrocarbon group containing 3 or 4 carbon atoms. Specific examples of $R^{26}$ are $-CH(CH_3)-CH_2-$, $-CH(C_2H_5)-CH_2-$, $-C(CH_3)_2-CH_2-$ and $-CH_2-CH_2-CH_2-CH_2-$. The molecular chain of the polyoxyalkylene polymer may be constituted of one single repeating unit species or two or more repeating unit species. The group $-CH(CH_3)-CH_2-$ is preferred as $R^{26}$ particularly because the polymer viscosity can be adequately reduced and the cured product can be provided with an appropriate level of flexibility by using that group.

The polyoxyalkylene polymer may be straight or branched or of a straight/branched mixed type.

The molecular weight distribution of the high-molecular-weight plasticizer is not particularly restricted but it is preferably narrow, namely lower than 1.8, more preferably not higher than 1.7, still more preferably not higher than 1.6, still further preferably not higher than 1.5, particularly preferably not higher than 1.4, most preferably not higher than 1.3.

The plasticizers, including the high-molecular-weight plasticizers mentioned above, may be used singly or two or more of them may be used in combination, although the use thereof is not always necessary. If necessary, it is also possible to use a high-molecular-weight plasticizer and, further, a low-molecular-weight plasticizer in combination unless the physical properties are adversely affected.

The incorporation of such a plasticizer(s) may also be done on the occasion of polymer production.

When a plasticizer is used, the amount thereof is not restricted but generally 5 to 800 parts by weight, preferably 10 to 600 parts by weight, more preferably 10 to 500 parts by weight, per 100 parts by weight of the vinyl polymer (I). When it is smaller than 5 parts by weight, the plasticizing effect tends to be hardly produced and, when it exceeds 800 parts by weight, the mechanical strength of cured products tends to become insufficient.

<<Polyoxyalkylene Polymer (IV) Containing at Least One Crosslinkable Silyl Group>>

A polyoxyalkylene polymer (IV) containing at least one crosslinkable silyl group may further be incorporated in the curable composition of the present invention.

The polyoxyalkylene polymer (IV) can be obtained by polymerization in the same method as for the polyoxyalkylene polymer plasticizers among the above plasticizer.

Preferably, the molecular chain of the polyoxyalkylene polymer (IV) is essentially constituted of a repeating unit represented by the general formula:

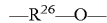

(wherein $R^{26}$ is a bivalent organic group). $R^{26}$ is preferably a bivalent hydrocarbon group containing 3 to 6 carbon atoms, more preferably mostly a hydrocarbon group containing 3 or 4 carbon atoms. Specific examples of $R^{26}$ are —CH(CH$_3$)—CH$_2$—, —CH(C$_2$H$_5$)—CH$_2$—, —C(CH$_3$)$_2$—CH$_2$— and —CH$_2$—CH$_2$—CH$_2$—CH$_2$—. The molecular chain of the polyoxyalkylene polymer may be constituted of one single repeating unit species or two or more repeating unit species. The group —CH(CH$_3$)—CH$_2$— is preferred as $R^{26}$ particularly because the polymer viscosity can be adequately reduced and the cured product can be provided with an appropriate level of flexibility by using that group.

The polyoxyalkylene polymer (IV) may be straight or branched or of a straight/branched mixed type. Some other monomer unit(s), for instance, may be contained therein. For attaining good workability and/or rendering the cured product flexible, however, the content of the repeating unit represented by —CH(CH$_3$)—CH$_2$—O— in the polymer is preferably not lower than 50% by weight, more preferably not lower than 80% weight.

The crosslinkable silyl group occurring in the polyoxyalkylene polymer and capable of being crosslinked under formation of a siloxane bond may be the same as the crosslinkable silyl group in the vinyl polymer (I). Thus, mention may be made of a group represented by the general formula 1:

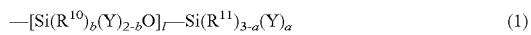

(wherein $R^{10}$ and $R^{11}$ each represents an alkyl group containing 1 to 20 carbon atoms, an aryl group containing 6 to 20 carbon atoms, an aralkyl group containing 7 to 20 carbon atoms or a triorganosiloxy group represented by (R')$_3$SiO— (in which R' is a hydrocarbon group containing 1 to 20 carbon atoms and the three R' groups may be the same or different) and when there are two or more $R^{10}$ or $R^{11}$ groups, they may be the same or different; Y represents a hydroxyl group or a hydrolyzable group and when there are two or more Y groups, they may be the same or different; a represents 1, 2 or 3, b represents 0, 1 or 2; l is an integer of 0 to 19; provided that the relation a+lb≧1 should be satisfied).

The hydrolyzable group includes, among others, a hydrogen atom and groups in conventional use, such as alkoxy, acyloxy, ketoximate, amino, amide, aminoxy, mercapto and alkenyloxy groups. Among these, alkoxy, amide and aminoxy groups are preferred, and alkoxy groups are particularly preferred in view of their mild hydrolyzability and easy handleability.

One to three of such hydrolyzable groups and hydroxyl groups can be bound to each silicon atom, and the sum (a+Σb) is preferably within the range of 1 to 5. In cases where there are two or more hydrolyzable/hydroxyl groups bound in the crosslinkable silyl group, they may be the same or different. The number of crosslinkable silyl group-constituting silicon atoms is at least 1 and, when a plurality of silicon atoms are linked together by siloxane bonding or the like, the number of silicon atoms is preferably not greater than 20. In particular, crosslinkable silyl groups represented by the general formula 7:

(wherein $R^{11}$, Y and a are as defined above): are preferred because of their ready availability.

Considering the curability, the integer a is preferably 2 or more, although this is not critical. One in which a is 3 (e.g. trimethoxy functional group) is faster in curability than one in which a is 2 (e.g. dimethoxy functional group) but, as for the storage stability and/or mechanical properties (e.g. elongation), one in which a is 2 is sometimes superior. For attaining a balance between curability and physical properties, one in which a is 2 (e.g. dimethoxy functional group) and one in which a is 3 (e.g. trimethoxy functional group) may be used in combination.

The average number of the crosslinkable silyl groups occurring in the polyoxyalkylene polymer (IV) is preferably at least one, more preferably within the range of 1.1 to 5, per molecule of that polymer. When the number of the crosslinkable silyl groups contained in the polyoxyalkylene polymer (IV) is smaller than 1, the curability becomes insufficient and the desired good rubber elasticity behavior can hardly be displayed. On the other hand, when it is larger than 5, the cured product becomes hard and the applicability to joints unfavorably decreases.

The crosslinkable silyl groups may occur terminally or internally in the molecular chain of the polyoxyalkylene polymer (IV). When the crosslinkable silyl groups occur at molecular chain termini, the effective network chain content resulting from the polyoxyalkylene polymer (IV) in the finally formed-cured product becomes high and, thus, it becomes easy to obtain rubbery cured products high in strength, high in elongation and low in elastic modulus.

The number average molecular weight (Mn) of the polyoxyalkylene polymer (IV) is not particularly restricted but, generally, it may be within the range of 500 to 100,000. From the low polymer viscosity and/or cured product rubber elasticity viewpoint, however, it is preferably within the range of 2,000 to 60,000, more preferably within the range of 5,000 to 30,000. The number average molecular weight of the polyoxyalkylene polymer (IV), so referred to herein, is the value determined by gel permeation chromatography (GPC) on the polystyrene equivalent basis. The molecular weight distribution (Mw/Mn) is desirably narrow, preferably not wider than 1.6, from the workability and/or cured product elongation viewpoint.

The crosslinkable silyl group-containing polyoxyalkylene polymer (IV) is preferably prepared by introducing a crosslinkable silyl group into a functional group-containing polyoxyalkylene polymer. The functional group-containing polyoxyalkylene polymer can be obtained by the conventional method of polymerization (anionic polymerization using a caustic alkali) for producing polyoxyalkylene polymers or by the chain extension reaction method using this polymer as the raw material or, further, by polymerization techniques using a porphyrin-aluminum complex catalyst as typically described in Japanese Kokai Publication Sho-61-197631, Japanese Kokai Publication Sho-61-215622, Japanese Kokai Publication Sho-61-215623, Japanese Kokai Publication Sho-61-218632 and the like, a double metal cyanide complex catalyst as typically disclosed in Japanese Kokoku Publication Sho-46-27250 and Japanese Kokoku Publication Sho-59-15336, or a polyphosphazene salt catalyst as typically disclosed in Japanese Kokai Publication Hei-10-273512, among others. For practical purposes, the technique employing a double metal cyanide complex catalyst is preferred. The molecular weight distribution of the crosslinkable silyl group-containing oxyalkylene polymer (IV) is dependent on the molecular weight distribution of the precursor polymer prior to introduction of the crosslinkable silyl group and, therefore, the molecular weight distribution of the precursor polymer is preferably as narrow as possible.

The introduction of crosslinkable silyl groups can be achieved by a known technique. Thus, for example, the following techniques can be mentioned.

(F) An oxyalkylene polymer having functional group such as hydroxyl group at molecular terminus is reacted with an organic compound having both an active group reactive with the above functional group and an unsaturated group. To the obtained reaction product is then added a crosslinkable silyl group-containing hydrosilane compound in the presence of a hydrosilylation catalyst in order to introduce a crosslinkable silyl group into the polymer terminus.

(G) An oxyalkylene polymer having a hydroxyl, epoxy, isocyanato, or the like functional group (hereinafter referred to as Z functional group) at a molecular terminus is reacted with a compound having both a functional group (hereinafter referred to as Z' functional group) which is reactive with said Z functional group and a crosslinkable silyl group in order to introduce a crosslinkable silyl group into the polymer terminus.

As the silicon compound having both the above Z' functional group and a crosslinkable silyl group, there can be mentioned, but not particularly limited to, amino group-containing silanes such as N-(β-aminoethyl)-γ-aminopropyltrimethoxysilane, N-(β-aminoethyl)-γ-aminopropylmethyldimethoxysilane and γ-aminopropyltrimethoxysilane; mercapto group-containing silanes such as γ-mercaptopropyltrimethoxysilane and γ-mercaptopropylmethyldimethoxysilane; epoxysilanes such as γ-glycidoxypropyltrimethoxysilane and 2-(3,4-epoxycyclohexyl)ethyltrimethoxysilane; vinyl type unsaturation-containing silanes such as vinyltriethoxysilane, γ-methacryloyloxypropyltrimethoxysilane, and γ-acryloyloxypropylmethyldimethoxysilane; chlorine atom-containing silanes such as γ-chloropropyltrimethoxysilane; isocyanato group-containing silanes such as γ-isocyanatopropyltriethoxysilane, and γ-isocyanatopropylmethyldimethoxysilane; and hydrosilanes such as methyldimethoxysilane, trimethoxysilane, and methyldiethoxysilane; among others.

Among the methods described above, the method (F) or the method (G) according to which a hydroxyl group-terminated polyoxyalkylene polymer is reacted with an isocyanato group- and crosslinkable silyl group-containing compound is preferred from the economy and/or efficient reaction progress viewpoint.

The polyoxyalkylene polymer (IV) is used in an amount preferably within the range of 0 to 1,000 parts by weight, more preferably within the range of 0 to 400 parts by weight, per 100 parts by weight of the vinyl polymer (I). When the polyoxyalkylene polymer (IV) amounts to 0 part by weight, namely when it is not used, the weather resistance is very good and, therefore, the composition can be applied, as a glazing sealant, to joints surrounding glass windows. When the polyoxyalkylene polymer (IV) is used in combination, the workability is improved and the elongation at break of the cured product is increased and, therefore, the composition becomes suited for use as a siding sealant.

<<Polymer (V) Containing a Crosslinkable Silyl Group>>

In the curable composition of the invention, polymer (V) containing a crosslinkable silyl group as obtained by a radical polymerization technique other than living radical polymerization may further be incorporated. As the "radical polymerization technique other than living radical polymerization" in the practice of the invention, there may be mentioned, for example, the above-mentioned "ordinary radical polymerization method" (e.g. free radical polymerization) and the "chain transfer method" among the "controlled radical polymerization" methods.

As the polymer (V) obtained by this method, an alkyl (meth)acrylate polymer (a) containing a crosslinkable silyl group (hereinafter, the above alkyl (meth)acrylate polymer (a) is sometimes called simply as "a polymer (a)") is preferred. The combined use of the vinyl polymer (I) and the alkyl (meth)acrylate polymer (a) containing a crosslinkable silyl group renders the composition improved in storage stability.

From the viewpoint of compatibility with the component (III) and (IV) as well as transparency, the molecular chain of the alkyl (meth)acrylate polymer (a) containing a crosslinkable silyl group is preferably a polymer substantially composed of (a) alkyl acrylate monomer units and/or alkyl methacrylate monomer units, in which the alkyl group contains 1 to 8 carbon atoms, and (b) alkyl acrylate monomer units and/or alkyl methacrylate monomer units, in which the alkyl group contains 9 to 20 carbon atoms.

The monomer units in the polymer (a), namely the alkyl acrylate monomer units and/or alkyl methacrylate monomer units, in which the alkyl group contains 1 to 20 carbon atoms, are represented by the general formula 23:

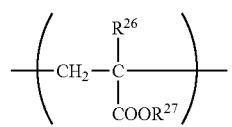

(wherein, $R^{26}$ represents a hydrogen atom or a methyl group, and $R^{27}$ represents an alkyl group containing 1 to 20 carbon atoms).

As $R^{27}$ in the above general formula (23), there may be mentioned alkyl groups containing 1 to 20 carbon atoms, such as methyl, ethyl, propyl, n-butyl, tert-butyl, 2-ethylhexyl, nonyl, lauryl, tridecyl, cetyl, stearyl and biphenyl. Those monomer species corresponding to the monomer units represented by the general formula (23) may be used each singly or two or more of them may be used in combination.

The alkyl acrylate monomer unit can be selected from a broad range of known esters of acrylic acid, such as methyl acrylate, ethyl acrylate, n-propyl acrylate, n-butyl acrylate, isobutyl acrylate, tert-butyl acrylate, n-hexyl acrylate, heptyl acrylate, 2-ethylhexyl acrylate, nonyl acrylate, decyl acrylate, undecyl acrylate, lauryl acrylate, tridecyl acrylate, myristyl acrylate, cetyl acrylate, stearyl acrylate, behenyl acrylate, and biphenyl acrylate, among others. The alkyl methacrylate monomer units can also be selected from a broad range of known esters of methacrylic acid, such as methyl methacrylate, ethyl methacrylate, n-propyl methacrylate, n-butyl methacrylate, isobutyl methacrylate, tert-butyl methacrylate, n-hexyl methacrylate, heptyl methacrylate, 2-ethylhexyl methacrylate, nonyl methacrylate, decyl methacrylate, undecyl methacrylate, lauryl methacrylate, tridecyl methacrylate, myristyl methacrylate, cetyl methacrylate, stearyl methacrylate, behenyl methacrylate, and biphenyl methacrylate, among others.

The molecular chain of the polymer (a) substantially consists of one or more kinds of alkyl acrylate and/or alkyl methacrylate monomer units. The term "substantially consist of said monomer units" as used here means that the proportion of said alkyl acrylate and/or alkyl methacrylate monomer units in the polymer (a) is larger than 50%, preferably not less than 70%. In addition to said alkyl acrylate and/or alkyl methacrylate monomer units, the polymer (a) may contain other copolymerizable units.

As other copolymerizable monomer units mentioned above, there can be mentioned, for example, acrylic acid compounds such as acrylic acid and methacrylic acid; amide group-containing acrylic monomers such as acrylamide, methacrylamide, N-methylolacrylamide and N-methylolmethacrylamide; epoxy group-containing acrylic monomers such as glycidyl acrylate and glycidyl methacrylate; amino group-containing acrylic monomers such as diethylaminoethyl acrylate, diethylaminoethyl methacrylate and aminoethyl vinyl ether; polyoxyethylene group-containing acrylic monomers such as polyoxyethylene acrylate and polyoxyethylene methacrylate; monomer units derived from acrylonitrile, styrene, α-methylstyrene, alkyl vinyl ethers, vinyl chloride, vinyl acetate, vinyl propionate, ethylene, etc.; and so on.

It is general for one skilled in the art that the monomeric composition of the polymer (a) can be selected according to the intended use and object. For uses and objects calling for strength, for instance, the composition with a comparatively high glass transition temperature is preferred. Thus, a composition with a glass transition temperature not below 0° C., more preferably not below 20° C., is preferred. For objects and uses with emphasis on viscosity and workability, for instance, conversely a composition with a comparatively low glass transition temperature, for example 0° C., is preferred.

As the polymer (a), a polymer having a number average molecular weight of 500 to 100,000, as measured by GPC relative to polystyrene standard, can be used. However, this is not particularly limitative. The number average molecular weight of the polymer (a) is preferably 3,000 or more, more preferably 5,000 or more, from the cured product elongation viewpoint.

The polymer (a) can be produced by a radical polymerization technique other than living radical polymerization, for example, the controlled vinyl polymerization technology, and the like. For example, it can be produced by the polymerization using a chain transfer agent with the radical solution polymerization or bulk polymerization method but these methods are not exclusive choices. When the polymerization is carried out by the chain transfer method using a specific functional group-containing chain transfer agent, silicon-containing functional group-containing polymers terminally having the functional group(s) are obtained. The polymerization reaction is generally carried out by reacting said monomers in the presence of a radical initiator, a chain transfer agent and a solvent at a temperature of 50 to 150° C.

The radical initiator mentioned above includes azobisisobutyronitrile, benzoyl peroxide, etc. and the chain transfer agent includes mercaptan compounds, for example, n-dodecylmercaptan, t-dodecylmercaptan, laurylmercaptan, etc., halogen-containing compounds, and so on. The solvent is preferably selected from among inert solvents such as ethers, hydrocarbons and esters.

Various methods are available for introducing a crosslinkable silyl group into the polymer (a). The methods include, but are not particularly limited to, (H) the method comprising polymerizing an alkyl acrylate monomer(s) and/or an alkyl methacrylate monomer(s) in the presence of a crosslinkable silyl group-containing mercaptan as the chain transfer agent for introducing the crosslinkable silyl group terminally into the molecule, (I) the method comprising polymerizing an alkyl acrylate monomer(s) and/or an alkyl methacrylate monomer(s) in the presence of a compound (e.g. acrylic acid) containing a mercapto group and a reactive functional group (other than a silyl group; hereinafter referred to as "group A") as the chain transfer agent and then reacting the resulting polymer with a compound (e.g. an isocyanato group- and —Si(OCH$_3$)$_3$ group-containing compound) containing a crosslinkable silyl group and a functional group (hereinafter referred to as "group A'") reactive with the group A for introducing the crosslinkable silyl group terminally into the molecule, and (J) the method comprising copolymerizing a compound containing a polymerizable unsaturated bond and a crosslinkable silyl group with an alkyl acrylate monomer(s) and/or an alkyl methacrylate monomer(s) under the polymerization conditions (e.g. monomer charge ratio, chain transfer agent amount, radical initiator amount, polymerization temperature) selected so that at least one crosslinkable silyl group may be introduced into each molecule.

The crosslinkable silyl group-containing mercaptan to be used as the chain transfer agent described above under (H) includes γ-mercaptopropyltrimethoxysilane, γ-mercaptopropylmethyldimethoxysilane and γ-mercaptopropyltriethoxysilane, among others.

As examples of the group A and group A' described above under (I), there are various combinations of groups. For example, mention may be made of amino, hydroxyl and carboxylic acid group as the group A and of isocyanato group as the group A'. In another example, the group A may be an allyl group and the group A' may be a hydrosilyl group (H—Si), as described in Japanese Kokai Publication Sho-54-36395, Japanese Kokai Publication Hei-01-272654 and Japanese Kokai Publication Hei-02-214759. In this case, the group A and group A' can bind to each other in the presence of a group VIII transition metal in the manner of hydrosilylation.

The compounds containing a polymerizable unsaturated bond and a crosslinkable silyl group as referred to above in connection with (J) include monomers represented by the general formula (24);

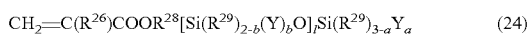
$$CH_2=C(R^{26})COOR^{28}[Si(R^{29})_{2-b}(Y)_bO]_lSi(R^{29})_{3-a}Y_a \qquad (24)$$

(wherein R$^{26}$ represents a hydrogen atom or a methyl group; R$^{28}$ represents a bivalent alkylene group of 1 to 6 carbon atoms; R$^{29}$ represents a group selected from substituted or unsubstituted monovalent organic groups containing 1 to 20 carbon atoms and triorganosiloxy groups and the two of R$^{29}$ may be the same or different; Y, a, b, and l are as defined above); or general formula 25;

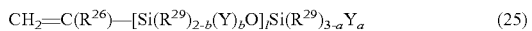
$$CH_2=C(R^{26})-[Si(R^{29})_{2-b}(Y)_bO]_lSi(R^{29})_{3-a}Y_a \qquad (25)$$

(wherein R$^{29}$, R$^{26}$, Y, a, b, and l are as defined above); for example, γ-methacryloxypropyl(alkyl)polyalkoxysilanes such as γ-methacryloxypropyltrimethoxysilane, γ-methacryloxypropylmethyldimethoxysilane and γ-methacryloxypropyltriethoxysilane; γ-acryloxypropyl(alkyl)polyalkoxysilanes such as γ-acryloxypropyltrimethoxysilane, γ-acryloxypropylmethyldimethoxysilane and γ-acryloxypropyltriethoxysilane; vinyl(alkyl)polyalkoxysilanes such as vinyltrimethoxysilane, vinylmethyldimethoxysilane, and vinyltriethoxysilane; and so on.

The number of crosslinkable silyl groups contained in the polymer (a) is required to be at least one per molecule. For assuring sufficient curability, the number is preferably not smaller than 1.1, more preferably not smaller than 1.5. The bonding sites may be on a side chain(s) and/or at the terminus or termini of the polymer chain.

Each crosslinkable silyl group contained in the polymer (a) may be a silyl group having one to three reactive functions on the silicon atom.

For use in the practice of the invention, the polymer (V) as obtained by a radical polymerization technique other than living radical polymerization is preferably used in an amount of 3 to 300 parts by weight per 100 parts by weight of the crosslinkable silyl group-containing vinyl polymer (I) whose main chain is produced by living radical polymerization.

<<Tin Curing Catalyst (VI)>>

A tin curing catalyst (VI) may further be incorporated in the curable composition of the present invention.

As examples of the tin curing catalyst (VI), there may be mentioned, among others, dialkyltin carboxylates such as dibutyltin dilaurate, dibutyltin diacetate, dibutyltin diethylhexanolate, dibutyltin dioctoate, dibutyltin di(methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); dialkyltin oxides, for example dibutyltin oxide, dioctyltin oxide, and mixtures of dibutyltin oxide and a phthalate ester; reaction products derived from a tetravalent tin compound, for example an dialkyltin oxides or dialkyltin diacetate, and a hydrolyzable silyl group-containing low-molecular-weight silicon compound, for example tetraethoxysilane, methyltriethoxysilane, diphenyldimethoxysilane or phenyltrimethoxysilane; bivalent tin compound such as stannous octylate, stannous naphthenate and stannous stearate; monoalkyltins, for example monobutyltin compounds such as monobutyltin trisoctoate and monobutyltin triisopropoxide, and monooctyltin compounds; reaction products and mixtures derived from an amine compound and an organotin compound, for example the reaction product derived from or mixtures of laurylamine and stannous octylate; chelate compounds such as dibutyltin bisacetylacetonate, dioctyltin bisacetylacetonate, dibutyltin bisethylacetonate and dioctyltin bisethylacetonate; tin alcoholates such as dibutyltin dimethylate, dibutyltin diethylate, dioctyltin dimethylate and dioctyltin diethylate; and the like.

Among those mentioned above, dibutyltin bisacetylacetonate and like chelate compounds and tin alcoholates are highly active as silanol condensation catalysts and, therefore, are preferred.

Among those mentioned above, dibutyltin bisacetylacetonate is particularly preferred because of its high catalytic activity, low cost and ready availability.

These tin curing catalysts (VI) may be used singly or two or more of them may be used in combination.

The level of addition of such tin curing catalyst (VI) is preferably about 0.1 to 20 parts by weight, more preferably 0.5 to 10 parts by weight, per 100 parts by weight of the vinyl polymer (I). When the addition level of the tin curing catalyst is less than 0.1 part by weight, the effect of the curing catalyst can hardly be exerted to a satisfactory extent in some cases. Conversely, when the level of addition of the tin curing catalyst exceeds 20 parts by weight, local heat generation and/or foaming may occur in the step of curing, making it difficult to obtain good cured products; in addition, the pot life becomes excessively short, and the workability tends to deteriorate.

<<Curable Composition>>

In the curable composition of the invention, there may be incorporated a curing catalyst and/or a curing agent appropriate for the respective crosslinkable functional group species at levels at which the effects of the invention are not lost. There may further be incorporated, at levels at which the effects of the invention are not lost, one or more of compounding ingredients according to the physical properties desired.

<Curing Catalyst, Curing Agent>

The crosslinkable silyl group-containing polymer is crosslinked and cured under siloxane bond formation in the presence or absence of various condensation catalysts known in the art. The properties of the cured products can widely range from rubber-like to resinous ones according to the molecular weight and main chain skeleton of the polymer.

As examples of such condensation catalyst except for the above-mentioned tin curing catalysts (VI), there may be mentioned, among others, titanate esters such as tetrabutyl titanate and tetrapropyl titanate; organoaluminum compounds such as aluminum trisacetylacetonate, aluminum tris(ethyl acetoacetate) and diisopropoxyalminium ethyl acetoacetate; chelate compounds such as zirconium tetraacetylacetonate and titanium tetraacetylacetoante; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; low-molecular-weight polyamide resins obtained from a polyamine in excess and a polybasic acid; reaction products from a polyamine in excess and an epoxy compound; amino group-containing silane coupling agents such as γ-aminopropyltrimethoxysilane and N-(β-aminoethyl)-γ-aminopropylmethyldimethoxysilane; and like silanol condensation catalysts and, further, other known silanol condensation catalysts such as acidic catalysts and basic catalysts.

These catalysts may be used singly or two or more of them may be used in combination. These catalysts may also be used in combination with the tin curing catalyst (VI). The level of addition of such condensation catalyst is preferably about 0.1 to 20 parts by weight, more preferably 0.5 to 10 parts by weight, per 100 parts by weight of the vinyl polymer (I). When the addition level of the condensation catalyst is less than 0.1 part by weight, the effect of the condensation catalyst can hardly be exerted to a satisfactory extent in some cases. Conversely, when the level of addition of the condensation catalyst exceeds 20 parts by weight, local heat generation and/or foaming may occur in the step of curing, making it difficult to obtain good cured products; in addition, the pot life becomes excessively short, and the workability tends to deteriorate.

For further increasing the activity of the condensation catalyst in the curable composition of the present invention, a silanol group-free silicon compound represented by the general formula 26:

$$(R^{30}{}_c Si(OR^{31})_{4-c} \tag{26}$$

(wherein $R^{30}$ and $R^{31}$ each independently is a substituted or unsubstituted hydrocarbon group containing 1 to 20 carbon atoms; when two or more groups $R^{30}$ or $R^{31}$ are present, they may be the same or different; and c is 0, 1, 2 or 3) may be added to the composition.

The above silicon compound is not restricted but those compounds of the general formula 26 in which $R^{30}$ is an aryl group containing 6 to 20 carbon atoms, such as phenyltrimethoxysilane, phenylmethyldimethoxysilane, phenyldimethylmethoxysilane, diphenyldimethoxysilane, diphenyldiethoxysilane and triphenylmethoxysilane, are preferred since their accelerating effect on the curing reaction of the composition is significant. In particular, diphenyldimethoxysilane and diphenyldiethoxysilane are low in cost and readily available, hence are most preferred.

The level of addition of this silicon compound is preferably about 0.01 to 20 parts by weight, more preferably 0.1 to 10 parts by weight, per 100 parts by weight of the vinyl polymer (I). When the level of addition of the silicon compound is below this range, the curing reaction-accelerating effect may decrease in certain cases. When, conversely, the level of addition of the silicon compound exceeds this range, the hardness and/or tensile strength of the cured products may fall.

<Adhesion Promoter>

A silane coupling agent and/or an adhesion promoter other than silane coupling agents may be incorporated in the curable composition of the invention. By adding an adhesion promoter, it becomes possible to further reduce the possibility that the sealant will peel off from the adherend, such as a siding board, as a result of changes in joint width due to external forces. In some cases, it becomes unnecessary to use a primer for improving the adhesion; simplification of construction works is thus expected. As specific examples of the silane coupling agent, there may be mentioned isocyanato group-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, 2-(3,4-epoxycyclohexyl)ethyltrimethoxysilane and 2-(3,4-epoxycyclohexyl)ethyltriethoxysilane; carboxysilanes such as β-carboxyethyltriethoxysilane, β-carboxyethylphenylbis (2-methoxyethoxy)silane, N-β-(carboxymethyl)aminoethyl-γ-aminopropyltrimethoxysilane, vinylic unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; isocyanuratosilanes such as tris (trimethoxysilyl)isocyanurate, and the like. Modification derivatives of these, for example amino-modified silyl polymers, silylated aminopolymers, unsaturated aminosilane complexes, phenylamino-long chain alkylsilanes, aminosilylated silicones, silylated polyesters and the like, can also be used as silane coupling agents.

The silane coupling agent is used, per 100 parts by weight of the vinyl polymer (I), preferably in an amount within the range of 0.1 to 20 parts by weight, more preferably 0.5 to 10 parts by weight.

As for the effect of the silane coupling agent added to the curable composition of the invention, it produces marked adhesive property improving effects under non-primer or primer-treated conditions when the composition is applied to various adherend materials, namely inorganic materials such as glass, aluminum, stainless steel, zinc, copper and mortar, or organic materials such as polyvinyl chloride, acrylics, polyesters, polyethylene, polypropylene and polycarbonates. When it is used under non-primer conditions, the improving effects on the adhesiveness to various adherends are particularly remarkable.

Specific examples of the adhesion promoters other than the silane coupling agent include, but are not particularly limited to, epoxy resins, phenol resins, sulfur, alkyl titanates and aromatic polyisocyanates, among others.

The adhesion promoters specifically mentioned above may be used singly or two or more of them may be used in admixture.

By adding these adhesion promoters, it is possible to improve the adhesiveness to adherends. Among the adhesion promoters mentioned above, silane coupling agents are preferably used in combination in an amount of 0.1 to 20 parts by weight to improve the adhesion, in particular the adhesion to the metal adherend surface such as the oil pan surface, although this is not critical.

<Filler>

In the curable composition of the invention, there may be incorporated one or more of various fillers, according to need. The fillers are not particularly restricted but include reinforcing fillers such as wood flour, pulp, cotton chips, asbestos, mica, walnut shell flour, rice hull flour, graphite, china clay, silica (e.g. fumed silica, precipitated silica, crystalline silica, fused silica, dolomite, silicic anhydride, hydrous silicic acid) and carbon black; fillers such as ground calcium carbonate, precipitated calcium carbonate, magnesium carbonate, diatomaceous earth, calcined clay, clay, talc, titaniumoxide, bentonite, organicbentonite, ferricoxide (red iron oxide), fine aluminum powder, flint powder, zinc oxide, activated zinc white, zinc powder, zinc carbonate and shirasu balloons; fibrous fillers such as asbestos, glass fibers and glass filaments, carbon fibers, Kevlar fibers and polyethylene fibers; and the like.

Preferred among these fillers are precipitated silica, fumes silica, crystalline silica, fused silica, dolomite, carbon black, calcium carbonate, titanium oxide, talc and the like.

Particularly, when high strength cured products are to be obtained using these fillers, a filler selected from among fumed silica, precipitated silica, crystalline silica, fused silica, silicic acid anhydride, hydrous silicic acid, carbon black, surface-treated fine calcium carbonate, calcined clay, clay and activated zinc white, among others, may be mainly added. Among them, those advantageously used are supermicropowder silicas having a specific surface area (measured by BET absorption method) in a degree of not less than 50 m²/g, usually 50 to 400 m²/g, and preferably 100 to 300 m²/g. Further preferred are silicas the surface of which is subjected to hydrophobic treatment in advance with organic silicon compounds such as organosilanes, organosilazanes or diorganocyclopolysiloxanes.

As more specific example of the fillers based on silicas having high reinforcing properties, there may be mentioned, but is not limited to, Aerosil (product of NIPPON AEROSIL CO., LTD.), which is one of fumed silicas, Nipsil (product of Nippon Silica Industrial), which is one of precipitated silicas, and the like. Particularly as for fumed silicas, those having average primary particle diameter of not smaller than 5 nm and not larger than 50 nm exhibit especially high reinforcing effect, and therefore more preferable.

In particular when low-strength, high-elongation cured products are to be obtained using such fillers, one or more fillers selected from among titanium oxide, calcium carbonate, talc, ferric oxide, zinc oxide, shirasu balloons and the like may be added. Generally, calcium carbonate, when small in specific surface area, may be insufficiently effective at improving the strength at break, elongation at break, adhesion and weather-resistant adhesion of cured products. As the specific surface area value increases, the effects of improving the strength at break, elongation at break, adhesion and weather-resistant adhesion become better.

Furthermore, calcium carbonate is more preferably surface-treated with a surface treating agent. When surface-treated calcium carbonate is used, it is expected that the workability of the composition of the invention be improved and the effects of improving the adhesion and weather-resistant adhesion of the curable composition be more improved as compared with the use of non-surface-treated calcium carbonate. Useful as the surface treating agent are organic substances such as fatty acids, fatty acid soaps and fatty acid esters, various surfactants, and various coupling agents such as silane coupling agents and titanate coupling agents. Specific examples include, but are not limited to, fatty acids such as caproic acid, caprylic acid, pelargonic acid, capric acid, undecanoic acid, lauric acid, myristic acid, palmitic acid, stearic acid, behenic acid and oleic acid, sodium, potassium and other salts of such fatty acids, and alkyl esters of such fatty acids. As specific examples of the surfactants, there may be mentioned sulfate ester type anionic surfactants such as polyoxyethylene alkyl ether sulfate esters and long-chain alcohol sulfate esters, and sodium, potassium and other salts thereof, sulfonic acid type anionic surfactants such as alkylbenzenesulfonic acids, alkylnaphthalenesulfonic acids, paraffinsulfonic acids, α-olefinsulfonic acids and alkylsulfosuccinic acid, and sodium, potassium and other salts thereof, and the like. In the surface treatment, the surface treating agent is used in an amount preferably within the range of 0.1 to 20% by weight, more preferably within the range of 1 to 5% by weight, relative to calcium carbonate. When the amount for treatment is smaller than 0.1% by weight, the effects of improving the workability, adhesion and weather-resistant adhesion may be insufficient and, when it exceeds 20% by weight, the storage stability of the curable composition may decrease.

When calcium carbonate is used in expectation of producing the effects of improving the thixotropic properties of the formulations and the strength at break, elongation at break, adhesion, weather-resistant adhesion and the like of the cured product, in particular, precipitated calcium carbonate is preferably used, although this does not mean any particular restriction.

On the other hand, ground calcium carbonate is sometimes added for the purpose of reducing the viscosity of the formulations, increasing the weight thereof and reducing the cost, for example. When ground calcium carbonate is used, such species as mentioned below can be used.

Ground calcium carbonate is prepared from natural chalk, marble, limestone or the like by mechanical grinding/processing. The method of grinding includes the dry method and wet method. Wet ground products deteriorate the storage stability of the curable composition of the invention in some cases. Upon classification, ground calcium carbonate gives various products differing in average particle size. In cases where the effects of improving the strength at break, elongation at break, adhesion and weather-resistant adhesion are expected, the specific surface area value is preferably not less than $1.5 \text{ m}^2/\text{g}$ and not more than $50 \text{ m}^2/\text{g}$, more preferably not less than $2 \text{ m}^2/\text{g}$ and not more than $50 \text{ m}^2/\text{g}$, still more preferably not less than $2.4 \text{ m}^2/\text{g}$ and not more than $50 \text{ m}^2/\text{g}$, most preferably not less than $3 \text{ m}^2/\text{g}$ and not more than $50 \text{ m}^2/\text{g}$, although this does not mean any particular restriction. When the specific surface area is smaller than $1.5 \text{ m}^2/\text{g}$, those improving effects may be insufficient. Of course, the above does not apply to the cases where it is only intended to reduce the viscosity and/or increase the weight.

For example, the combined use, according to need, of ground calcium carbonate having a specific surface area value of not smaller than $1.5 \text{ m}^2/\text{g}$ and precipitated calcium carbonate is fully expected to suppress the viscosity increase in the formulations to a moderate level and produce the effects of improving the strength at break, elongation at break, adhesion and weather-resistant adhesion of cured products, although this does not mean any particular restriction.

The specific surface area value is the measured value obtained by using, as the measurement method, the air permeation method (method for specific surface area determination based on the permeability of a powder-packed layer to air) carried out according to JIS K 5101. Preferred for use as the measuring instrument is a Shimadzu model SS-100 specific surface area measuring apparatus.

Those fillers may be used singly or two or more of them may be used in combination according to the intended purpose or necessity.

When a filler is used, the filler is preferably used in an amount within the range of 5 to 5,000 parts by weight, more preferably within the range of 10 to 2,500 parts by weight, particularly preferably within the range of 15 to 1,500 parts by weight, per 100 parts by weight of the vinyl polymer (I). When the addition level is lower than 5 parts by weight, the effects of improving the strength at break, elongation at break, adhesion and weather-resistant adhesion may be insufficient and, when the amount exceeds 5,000 parts by weight, the workability of the curable composition may deteriorate.

<Hollow Microsphere>

Furthermore, for the purpose of reducing the weight and cost without causing significant deteriorations in physical properties, hollow microspheres may be used in combination with such a reinforcing filler as mentioned above.

Such hollow microspheres (hereinafter referred to as "balloons") are not particularly restricted but include, for example, hollow spheres constituted of an inorganic or organic material and having a diameter of not greater than 1 mm, preferably not greater than 500 μm, more preferably not greater than 200 μm, as described in "Kinosei Fira no Saishin Gijutsu (Latest Technology of Functional Fillers)" (CMC Publishing Co., LTD). In particular, hollow microspheres having a true specific gravity of not higher than $1.0 \text{ g/cm}^3$ are preferably used and, more preferably, hollow microspheres having a true specific gravity of not higher than $0.5 \text{ g/cm}^3$ are used.

The inorganic balloons include silicic balloons and non-silicic balloons. Examples of the silicic balloons are shirasu balloons, perlite, glass balloons, silica balloons, fly ash balloons and the like, and examples of the non-silicic balloons are alumina balloons, zirconia balloons, carbon balloons and the like. Commercially available as specific examples of such inorganic balloons are Idichi Kasei's Winlite and Sanki Kogyo Co., Ltd.'s Sankilite (shirasu balloons), Sumitomo 3M Limited's Cel-Star Z-28, Emerson & Cuming Company's Micro Balloon, Pittsburgh Corning Corporation's Ceramic Glassmodules and Sumitomo 3M Limited's Glass Bubbles (glass balloons), Asahi Glass Co., Ltd.' Q-Cel and Taiheiyo Cement Corporation's E-Spheres (silica balloons), Pfamarketing's Cerospheres and Fillite U.S.A.'s Fillite (fly ash balloons), Showa Denko K.K.'s BW (alumina balloons), Zircoa Inc.'s Hollow Zirconium Spheres (zirconia balloons), and Kureha Chemical Industry's Kurekasphere and General Technologies Inc.' Carbosphere (carbon balloons).

The organic balloons include thermosetting resin balloons and thermoplastic resin balloons. Examples of the thermosetting resin balloons are phenol balloons, epoxy balloons and urea balloons, and examples of the thermoplastic balloons are Saran balloons, polystyrene balloons, polymethacrylate balloons, polyvinyl alcohol balloons and styrene-acrylic type balloons. Crosslinked thermoplastic resin balloons can also be used. The balloons so referred to herein may be balloons after expansion or balloons produced by expansion following incorporation of a blowing agent-containing resin.

As specific examples of such organic balloons which are commercially available, there may be mentioned Union Carbide Corporation's Ucar and Phenolic Microballoons (phenol balloons), Emerson & Cuming Company's Eccospheres (epoxy balloons), Emerson & Cuming Company's Eccospheres VF-O (urea balloons), Dow Chemical Company's Saran Microspheres, AKZO NOBEL's Expancel and Matsumoto Yushi Seiyaku Co., Ltd.'s Matsumoto Microspheres (Saran balloons), Arco Polymers Inc.'s Dylite Expandable Polystyrene and BASF-Wyandotte's Expandable Polystyrene Beads (polystyrene balloons), and JSR Corporation's SX863(P) (crosslinked styrene-acrylic balloons).

The above-mentioned balloon species may be used singly or two or more of them may be used in admixture. Furthermore, those balloons surface-treated with a fatty acid, a fatty acid ester, rosin, rosin acid lignin, a silane coupling agent, a titan coupling agent, an aluminum coupling agent, polypropylene glycol or the like for improving the dispersibility and the workability of the formulations may also be used. These balloons are used for reducing the weight and cost without impairing the flexibility and elongation/strength among the physical properties after curing of the formulations containing them.

The balloon content is not particularly restricted but the balloons can be used preferably in an amount within the range of 0.1 to 50 parts by weight, more preferably 0.1 to 30 parts by weight, per 100 parts by weight of the vinyl polymer (I). When this amount is smaller than 0.1 part by weight, the weight-reducing effect is slight and, when it exceeds 50 parts by weight, decreases in tensile strength, among the mechanical properties after curing of the balloon-containing formulations, are observed in some instances. When the balloons have a specific gravity of not lower than 0.1, the amount is preferably 3 to 50 parts by weight, more preferably 5 to 30 parts by weight.

<Physical Property Modifier>

In the curable composition of the invention, there may be incorporated a physical property modifier capable of adjusting the tensile properties of the resulting cured products, according to need.

The physical property modifiers are not particularly restricted but include, for example, alkylakoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane, γ-glycidoxypropylmethyldiisopropenoxysilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; polysiloxanes; and the like. By using such as a physical property modifier, it is possible to increase the hardness of the cured products after curing of the curable composition of the invention or decrease such hardness and attain extensibility. Such physical property modifiers as mentioned above may be used singly or two or more of them may be used in combination.

The content of the physical property modifier is not particularly restricted but the physical property modifiers can be used preferably in an amount within the range of 0.1 to 80 parts by weight, more preferably 0.1 to 50 parts by weight, per 100 parts by weight of the vinyl polymer (I). When this amount is smaller than 0.1 part by weight, the weight-reducing effect is slight and, when it exceeds 80 parts by weight, decreases in tensile strength, among the mechanical properties after curing of the formulations, are observed in some instances.

<Silanol-Containing Compound>

A silanol-containing compound may optionally be added, as a modulus adjuster, into the curable composition of the present invention.

The silanol-containing compound means a compound having one silanol group in a molecule and/or a compound capable of forming a compound having one silanol group in a molecule by a reaction with moisture. When these compounds are used, only one of the above two compounds may be used, or both of them may be used simultaneously.

The compounds having one silanol group in a molecule is not particularly restricted. Among others, there may be mentioned compounds which can be represented by the formula (R")$_3$SiOH (wherein R"s are the same or different kind of substituted or non-substituted alkyl or aryl group), for example, the following compounds:

(CH$_3$)$_3$SiOH, (CH$_3$CH$_2$)$_3$SiOH, (CH$_3$CH$_2$CH$_2$)$_3$SiOH, (n-Bu)$_3$SiOH, (sec-Bu)$_3$SiOH, (t-Bu)$_3$SiOH, (t-Bu)Si(CH$_3$)$_2$OH, (C$_5$H$_{11}$)$_3$SiOH, (C$_6$H$_{13}$)$_3$SiOH, (C$_6$H$_5$)$_3$SiOH, (C$_6$H$_5$)$_2$Si(CH$_3$)OH, (C$_6$H$_5$)Si(CH$_3$)$_2$OH, (C$_6$H$_5$)$_2$Si(C$_2$H$_5$)OH, C$_6$H$_5$Si(C$_2$H$_5$)$_2$OH, C$_6$H$_5$CH$_2$Si(C$_2$H$_5$)$_2$OH, C$_{10}$H$_7$Si(CH$_3$)$_2$OH, (wherein C$_6$H$_5$ represents phenyl group and C$_{10}$H$_7$ represents a naphthyl group;

silanol group-containing cyclic polysiloxanes compounds, for example, the following compounds;

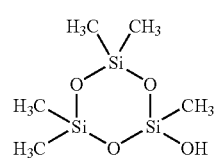

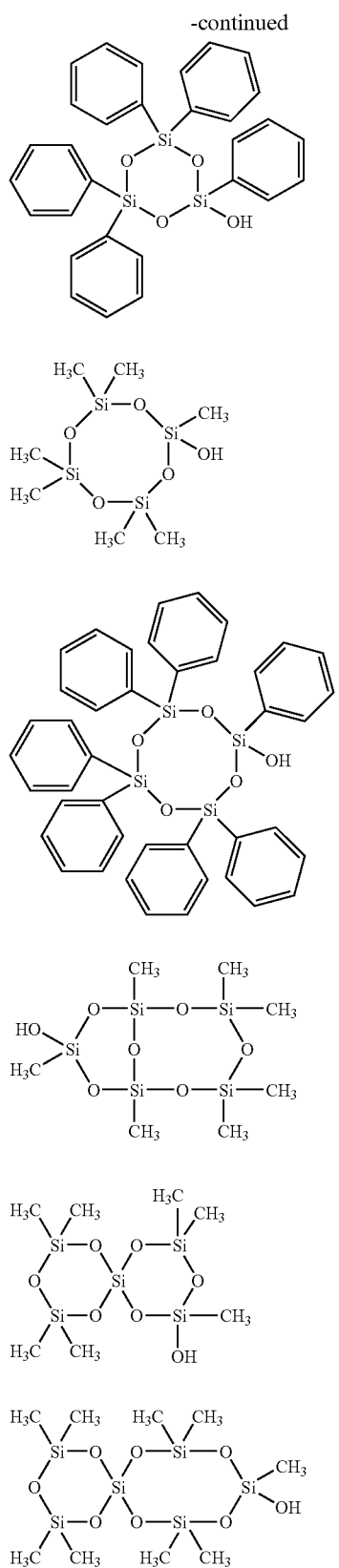

silanol group-containing chain polysiloxanes compounds, for example, the following compounds:

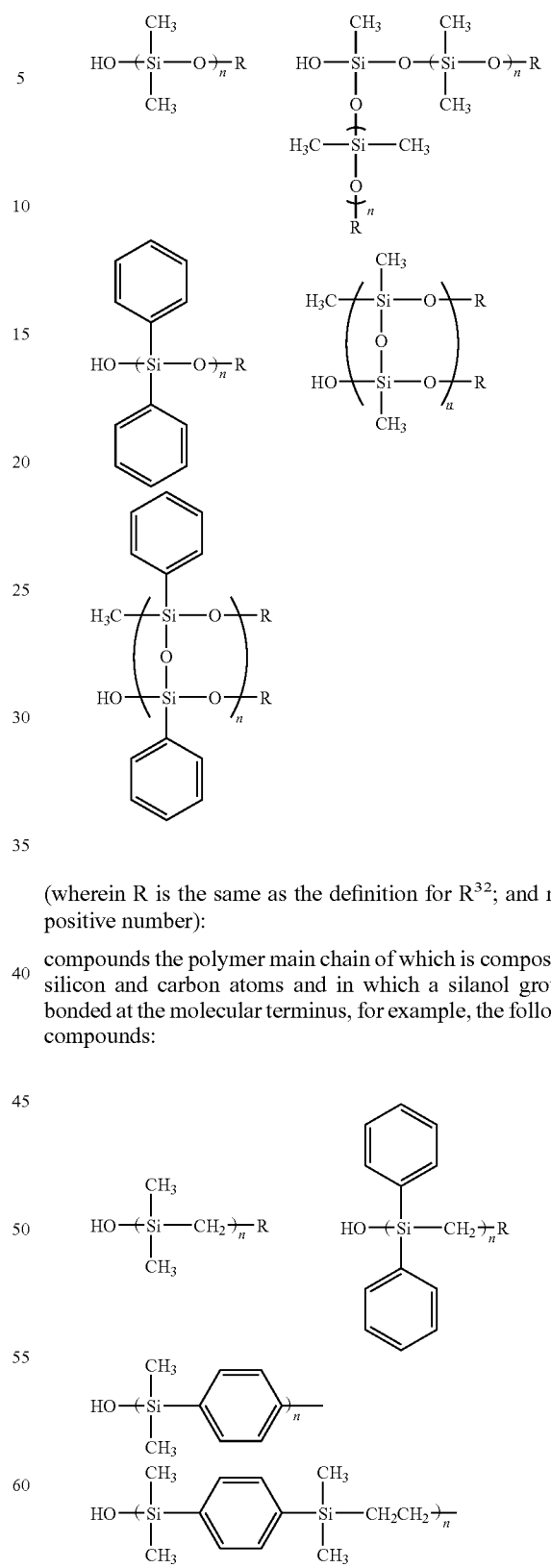

(wherein R is the same as the definition for $R^{32}$; and n is a positive number):

compounds the polymer main chain of which is composed of silicon and carbon atoms and in which a silanol group is bonded at the molecular terminus, for example, the following compounds:

(wherein R is the same as the definition for $R^{32}$; and n is a positive number):

compounds in which silanol group is bonded to the main chain of polysilane at a molecular terminus, for example, the following compounds:

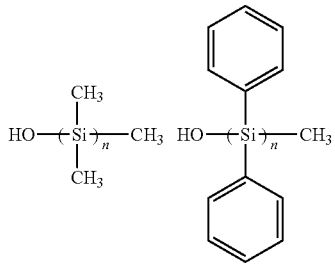

(wherein n is a positive number):

and compounds the polymer main chain of which is composed of silicon, carbon and oxygen atoms and in which a silanol group is bonded at the molecular terminus, for example, the following compounds:

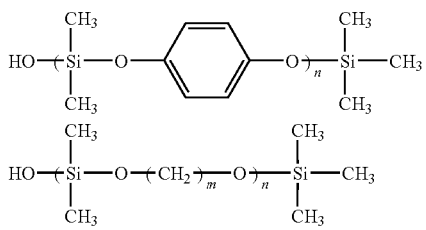

(wherein each of m and n is a positive number): and the like. Among them, the compounds represented by the following formula (27) are preferred.

$$(R^{32})_3SiOH \tag{27}$$

(wherein $R^{32}$ represents a univalent hydrocarbon group containing 1 to 20 carbon atoms, and a plurality of $R^{32}$ may be the same or different).

$R^{32}$ is preferably methyl, ethyl, vinyl, t-butyl or phenyl group, and, in view of ready availability and effects, more preferably methyl group.

It is presumed that flexibility of a cured product is given by a reaction of a compound having one silanol group in one molecule with a crosslinkable silyl group of the vinyl polymer (I) or a siloxane bond formed by crosslinking, to thereby reduce crosslinking points.

The compounds capable of forming a compound having one silanol group in a molecule by a reaction with moisture are not particularly restricted, but are preferably compounds in which the compound having one silanol group in a molecule formed by a reaction with moisture (the compound is a hydrolysis product) is represented by the general formula (27). For example, the following compounds may be mentioned in addition to the compounds represented by the general formula (28), as described below. However, these are not particularly limitative. Such compounds which may be suitably used are N,O-bis(trimethylsilyl)acetamide, N-(trimethylsilyl)acetamide, bis(trimethylsilyl)trifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, $(CH_3)_3SiNHSi(CH_3)_3$, $(CH_3)_3SiNSi(CH_3)_2$, and the following compounds:

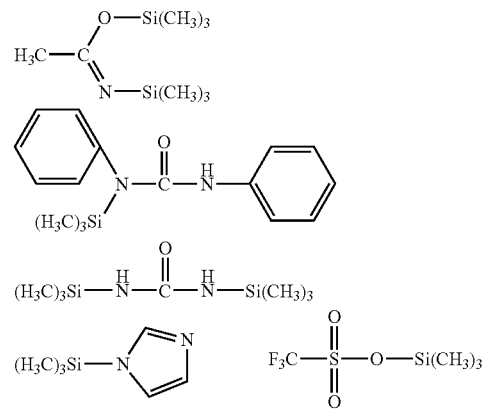

Among them, $(CH_3)_3SiNHSi(CH_3)_3$ is particularly preferred in view of an amount of contained silanol group in a hydrolysis product.

Furthermore, compounds capable of forming a compound having one silanol group in a molecule by a reaction with moisture are not particularly restricted, but the compounds represented by the following general formula (28) are preferred in addition to the above compounds:

$$((R^{32})_3SiO)_qR^{33} \tag{28}$$

(wherein $R^{32}$ is as defined above; q represents a positive number; and $R^{33}$ represents a group exclusive of a part of or all of the active hydrogen from an active hydrogen-containing compound) $R^{32}$ is preferably methyl, ethyl, vinyl, t-butyl, or phenyl group, and more preferably methyl group.

$(R^{32})_3SiO$ group is preferably trimethylsilyl group in which all three $R^{32}$s are methyl group, and q is preferably 1 to 5.

Active hydrogen-containing compounds, which are origins of the above $R^{33}$, are not particularly restricted, but includes, among others, alcohols such as methanol, ethanol, n-butanol, i-butanol, t-butanol, n-octanol, 2-ethylhexanol, benzyl alcohol, ethylene glycol, diethylene glycol, polyethylene glycol, propylene glycol, dipropylene glycol, polypropylene glycol, propanediol, tetramethylene glycol, polytetramethylene glycol, glycerin, trimethylolpropane and pentaerythritol; phenols such as phenol, cresol, bisphenol A and hydroquinone; carboxylic acids such as formic acid, acetic acid, propionic acid, lauric acid, palmitic acid, stearic acid, behenic acid, acrylic acid, methacrylic acid, oleic acid, linolic acid, linolenic acid, sorbic acid, oxalic acid, malonic acid, succinic acid, adipic acid, maleic acid, benzoic acid, phthalic acid, terephthalic acid and trimellitic acid; ammonia; amines such as methylamine, dimethylamine, ethylamine, diethylamine, n-butylamine and imidazole; acid amides such as acetamide and benzamide; ureas such as urea and N,N'-diphenylurea; and ketones such as acetone, acetylketone and 2,4-heptadione.

Although it is not particularly limited, a compound capable of forming a compound having one silanol group in a molecule by a reaction with moisture, represented by the above general formula (28), is obtainable by, for example, subjecting the above-mentioned active hydrogen-containing compound or the like to the reaction with the compound having a group capable of reacting with the active hydrogen, such as halogen group, together with a $(R^{58})_3Si$ group, which is sometimes referred to as "silylating agent", such as trimethylsilyl chloride or dimethyl(t-butyl)silylchloride. In the above description, $R^{32}$ is the same one as defined above.

The compounds represented by the general formula (28) includes allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3,-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, and the like. These may be used singly or in combination of two or more.

Additionally, the compounds which may be represented by the general formula $((R^{34})_3SiO)(R^{35}O)_s)_tD$, $CH_3O(CH_2CH(CH_3)O)_5Si(CH_3)_3$, $CH_2=CHCH_2(CH_2CH(CH_3)O)_5Si(CH_3)_3$, $(CH_3)_3SiO(CH_2CH(CH_3)O)_5Si(CH_3)_3$, and $(CH_3)_3SiO(CH_2CH(CH_3)O)_7Si(CH_3)_3$ (wherein $R^{34}$ represents the same or different kind of substituted or unsubstituted univalent hydrocarbon group; $R^{35}$ is an bivalent hydrocarbon group containing 1 to 8 carbon atoms; s and t are positive numbers, t is 1 to 6 and s times t is not less than 5; and D is an mono- to hexa-valent organic group), are also suitably used. These may be used singly or in combination of two or more.

Among the compounds capable of forming a compound having one silanol group in a molecule by a reaction with moisture, the active hydrogen compounds which is formed after hydrolysis are preferably phenols, acid amides and alcohols since there are no adverse affects on storage stability, weatherability or the like. More preferred are phenols and alcohols, in which the active hydrogen compound is a hydroxyl group.

Among the above compounds, preferred are N,O-bis(trimethylsilyl)acetamide, N-(trimethylsilyl)acetamide, trimethylsilylphenoxide, trimethylsilylated product of n-octanol, trimethylsilylated product of 2-ethylhexanol, tris(trimethylsilyl)ated product of trimethylolpropane, tris(trimethylsilyl)ated product of pentaerythritol, tetra(trimethylsilyl)ated product of pentaerythritol, and the like.

The compounds capable of forming a compound having one silanol group in a molecule by a reaction with moisture produces the compound having one silanol group in a molecule by reacting with moisture during storage, at the time of curing, or after curing. It is presumed that flexibility of a cured product is given by a reaction of the thus-formed compound having one silanol group in a molecule with a crosslinkable silyl group of the vinyl polymer (I) or a siloxane bond formed by crosslinking, to thereby reduce crosslinking points.

The addition level of the silanol-containing compound can be properly adjusted depending on the expected physical properties of the cured product. The addition level of the silanol-containing compound is 0.1 to 50 parts by weight, preferably 0.3 to 20 parts by weight and still more preferably 0.5 to 10 parts by weight, per 100 parts by weight of the vinyl polymer (I). When the level is below 0.1 parts by weight, the effects caused by addition may not appear, and on the contrary, when it exceeds 50 parts by weight, crosslinking may be insufficient and strength or gel fraction ratio of the cured product tend to deteriorate.

The time to add the silanol compound into the vinyl polymer (I) is not particularly restricted, but it may be added in the production process of the vinyl polymer (I), or may be added in the preparation process of a curable composition.

<Thixotropic Agent (Antisagging Agent)>

If necessary, a thixotropic agent (antisagging agent) may be added to the curable composition of the invention to prevent sagging and improve the workability.

The thixotropic agents (antisagging agents) are not particularly restricted but include, for example, polyamide waxes, hydrogenated castor oil derivatives; metal soaps such as calcium stearate, aluminum stearate and barium stearate, and the like. These thixotropic agents (antisagging agent) may be used singly or two or more of them may be used in combination.

The addition level of the thixotropic agent is 0.1 to 50 parts by weight, and preferably 0.2 to 25 parts by weight, per 100 parts by weight of the vinyl polymer (I). When the level is below 0.1 parts by weight, the thixotropic effects may not appear sufficiently, and on the contrary, when it exceeds 50 parts by weight, viscosity of the formulation may increase and storage stability of the formulation tends to deteriorate.

<Light Stabilizer>

In the curable composition of the invention, there may be incorporated a light stabilizer, if necessary. Various of these are known and mention may be made of various species described, for example, in "Sankaboshizai Handbook (Handbook of Antioxidants)" published by Taiseisha LTD. and "Kobunshi Zairyo no Rekka to Anteika (Degradation and Stabilization of Polymer Materials)" (pp. 235-242) published by CMC Publishing CO., LTD.

As specific examples of the light stabilizers, there may be mentioned, for example, benzotriazole compounds such as TINUVIN P, TINUVIN 234, TINUVIN 320, TINUVIN 326, TINUVIN 327, TINUVIN 329 and TINUVIN 213 (all being products of Ciba Specialty Chemicals), triazines such as TINUVIN 1577, benzophenones such as CHIMASSORB 81, benzoate compounds such as TINUVIN 120 (all being products of Ciba Specialty Chemicals), and the like ultraviolet absorbers, and hindered amine compounds.

Among them, hindered amine compounds are more preferred. As specific examples of the hindered amine compounds, the following can be mentioned, but there is no restriction, however; dimethyl succinate-1-(2-hydroxyethyl)-4-hydroxy-2,2,6,6-tetramethylpiperidine polycondensate, poly[{6-(1,1,3,3-tetramethylbutyl)amino-1,3,5-triazine-2,4-diyl}{(2,2,6,6-tetramethyl-4-piperidyl)imino}], N,N'-bis(3-aminopropyl)ethylenediamine-2,4-bis [(N-butyl-N-(1,2,2,6,6-pentamethyl-4-piperidyl)amino]-6-chloro-1,3,5-triazine condensate, bis(2,2,6,6-tetramethyl-4-piperidyl)sebacate, bis(2,2,6,6-tetramethyl-4-piperidinyl)succinate and the like.

Examples of the relevant product names include, but are not limited to, TINUVIN 622LD, TINUVIN 144 and CHIMASSORB 944LD, CHIMASSORB 119FL (all being products of Ciba Specialty Chemicals), Adekastab LA-52, Adekastab LA-57, Adekastab LA-62, Adekastab LA-67, Adekastab LA-63, Adekastab LA-68, Adekastab LA-82 and Adekastab LA-87 (all being products of Asahi Denka Co., Ltd.), and Sanol LS-770, Sanol LS-765, Sanol LS-292, Sanol LS-2626, Sanol LS-1114, Sanol LS-744 and Sanol LS-440 (all being products of Sankyo Co., Ltd.), and the like.

The light stabilizer may be used in combination with the antioxidant, and such combined use enhances the effects thereof and may improve the heat resistance and the weather resistance, hence is particularly preferred. Such ready-made mixtures of an antioxidant and a light stabilizer as TINUVIN C353 and TINUVIN B75 (both being products of Ciba Specialty Chemicals) and the like may also be used.

An ultraviolet absorber and a hindered amine compound (HALS) are sometimes used in combination in order to improve the weather resistance. The combined use of may produce enhanced effects and, therefore, both may be used in combination without any particular restriction, and the combined use is sometimes favorable.

The light stabilizers to be used are not particularly restricted, but those having high molecular weight are preferred because they exhibit heat resistance-improving effect according to the present invention for long period of time.

The addition level of the light stabilizer is preferably within the range of 0.1 to 20 parts by weight per 100 parts by weight of the vinyl polymer (I). At levels below 0.1 part by weight, the heat resistance-improving effect is insignificant, while levels exceeding 20 parts by weight make no great difference in effect any longer, hence are economically disadvantageous.

<Photocurable Substance>

To the curable composition of the invention, there may be added a photocurable substance, according to need. The photocurable substance is a substance whose molecular structure undergoes a chemical change in a short time under the action of light and which thus causes changes of physical properties such as curing. By adding such photocurable substance, it becomes possible to reduce the tackiness (residual tack) of the cured product surface after curing of the curable composition. This photocurable substance is a substance capable of curing upon irradiation with light. A typical photocurable substance is a substance capable of curing when allowed to stand at an indoor place in the sun (near a window) at room temperature for 1 day, for example. A large number of compounds of this type are known, including organic monomers, oligomers, resins, and compositions containing them, and they are not particularly restricted in kind but include, for example, unsaturated acrylic compounds, vinyl cinnamate polymers, azidated resins and the like.

As the unsaturated acrylic compounds, there may be specifically mentioned, for example, (meth)acrylate esters of low-molecular-weight alcohols such as ethylene glycol, glycerol, trimethylolpropane, pentaerythritol and neopentyl alcohol; (meth)acrylate esters of alcohols derived from acids such as bisphenol A, acids such as isocyanuric acid or such low-molecular-weight alcohols as mentioned above by modification with ethylene oxide and/or propylene oxide; (meth)acrylate esters of hydroxyl-terminated polyether polyols whose main chain is a polyether, polymer polyols obtained by radical polymerization of a vinyl monomer(s) in a polyol whose main chain is a polyether, hydroxyl-terminated polyester polyols whose main chain is a polyester, polyols whose main chain is a vinyl or (meth)acrylic polymer and which have hydroxyl groups in the main chain, and like polyols; epoxy acrylate oligomers obtained by reacting a bisphenol A-based, novolak type or other epoxy resin with (meth)acrylic acid; urethane acrylate type oligomers containing urethane bonds and (meth)acryl groups within the molecular chain as obtained by reacting a polyol, a polyisocyanate and a hydroxyl group-containing (meth)acrylate; and the like.

The vinyl cinnamate polymers are photosensitive resins whose cinnamoyl groups function as photosensitive groups and include cinnamic acid-esterified polyvinyl alcohol species and various other polyvinyl cinnamate derivatives.

The azidated resins are known as photosensitive resins with the azido group serving as a photosensitive group and generally include photosensitive rubber solutions with an azide compound added as a photosensitive substance and, further, detailed examples are found in "Kankosei Jushi (Photosensitive Resins)" (published Mar. 17, 1972 by Insatsu Gakkai Shuppanbu, pages 93 ff, 106 ff, 117 ff). These can be used either singly or in admixture, with a sensitizer added, if necessary.

Among the photocurable substances mentioned above, unsaturated acrylic compounds are preferred in view of their easy handleability.

The photocurable substance is preferably added in an amount of 0.01 to 30 parts by weight per 100 parts by weight of the vinyl polymer (I). At addition levels below 0.01 part by weight, the effects will be insignificant and, at levels exceeding 30 parts by weight, the physical properties may be adversely affected. The addition of a sensitizer such as a ketone or nitro compound or a promoter such as an amine can enhance the effects in some instances.

<Air Oxidation-Curable Substance>

In the curable composition of the invention, there may be incorporated an air oxidation-curable substance, if necessary. The air oxidation-curable substance is a compound containing an unsaturated group capable of being crosslinked for curing by oxygen in the air. By adding such air oxidation-curable substance, it becomes possible to reduce the tack (also referred as residual tack) of the cured product surface on the occasion of curing of the curable composition. This air oxidation-curable substance is a substance capable of curing upon contacting with air and, more specifically, has a property such that it cures as a result of reaction with oxygen in the air. A typical air oxidation-curable substance can be cured upon allowing it to stand in the air in a room for 1 day, for example.

As specific examples of the air oxidation-curable substance, there may be mentioned, for example, drying oils such as tung oil and linseed oil; various alkyd resins obtained by modification of such drying oils; drying oil-modified acrylic polymers, epoxy resins, silicone resins; 1,2-polybutadiene, 1,4-polybutadiene, C5-C8 diene polymers and copolymers and, further, various modifications of such polymers and copolymers (e.g. maleinated modifications, boiled oil modifications); and the like. Among these, tung oil, liquid ones among the diene polymers (liquid diene polymers) and modifications thereof are particularly preferred.

As specific examples of the liquid diene polymers, there may be mentioned, for example, liquid polymers obtained by polymerization or copolymerization of diene compounds such as butadiene, chloroprene, isoprene and 1,3-pentadiene, NBR, SBR and like polymers obtained by copolymerization of such diene compounds (as main components) with a monomer copolymerizable therewith, such as acrylonitrile or styrene, and, further, various modification thereof (e.g. maleinated modifications, boiled oil modifications). These may be used singly or two or more of them may be used in combination. Among these liquid diene compounds, liquid polybutadiene species are preferred.

The air oxidation-curable substances may be used singly or two or more of them may be used in combination. The use of a catalyst capable of promoting the oxidation curing or a metal drier in combination with the air oxidation-curable substance can enhance the effects in certain instances. As such catalysts or metal driers, there may be mentioned, for example, metal salts such as cobalt naphthenate, lead naphthenate, zirconium naphthenate, cobalt octylate and zirconium octylate, amine compounds, and the like.

The air oxidation-curable substance is preferably added in an amount of 0.01 to 30 parts by weight per 100 parts by weight of the vinyl polymer (I). At levels below 0.01 part by weight, the effects will be insignificant and, at levels exceeding 30 parts by weight, the physical properties may be adversely affected.

<Other Additives>

If necessary, one or more of various additives may be added to the curable composition of the invention for the purpose of adjusting various physical properties of the curable composition or cured products. Such additives include, for example, flame retardants, curability modifiers, metal deactivators, antiozonants, phosphorus-containing peroxide decomposers, lubricants, pigments, blowing agents and the like. These various additives may be used singly or two or more of them may be used in combination.

Specific examples of such additives are described, for example in Japanese Kokoku Publication Hei-04-69659, Japanese Kokoku Publication Hei-07-108928, Japanese Kokai Publication Sho-63-254149 and Japanese Kokai Publication Sho-64-22904.

<Production of the Curable Composition>

The curable composition of the invention may be prepared as a one package formulation, which is to be cured by the moisture in the air after application, by compounding all the components/ingredients and tightly sealing in a container for storage, or as a two-pack type formulation by separately preparing a curing agent by compounding a curing catalyst, a filler, a plasticizer, water and the like, so that such composition and the polymer composition may be mixed together prior to use. In the case of such two-pack type, a colorant or colorants can be added on the occasion of mixing of the two compositions. Thus, in providing sealants matching in color to the given siding boards, for example, a wide assortment of colors become available with limited stocks and thus it becomes easy to cope with the market demand for many colors; this is more favorable for low buildings and the like. By mixing the colorant or colorants, for example a pigment or pigments, with a plasticizer and/or a filler, as the case may be, and using the thus-prepared paste, it becomes possible to facilitate the working process. Furthermore, it is possible to finely adjust the curing rate by adding a retarder on the occasion of mixing up the two compositions.

<Curable Composition for a Transparent Material>

The curable composition for a transparent material, according to the present invention, can be particularly effectively utilized when the adherend is a transparent material. The transparent materials, so referred to herein, include all materials that are permeable to light, including not only completely transparent materials but also semitransparent ones reduced in transparency, ones the material surface of which has been made to have small projections and indentations, and ones not clear as a result of corrosion with hydrogen fluoride but still permeable to light, among others. Also included are those materials (substrates) which comprise a transparent material constituting a part of the structure thereof, for example mirrors produced by applying amalgam to the back of sheet glass. The transparent material is not particularly restricted but includes, among others, such materials for building and construction as glass, polycarbonates, polymethyl methacrylate, other poly(meth)acrylates, polystyrene, polyvinyl chloride and other synthetic resins. Among them, glass is particularly preferred.

The transparent material may be provided, on the surface thereof, with a layer having photocatalytic activity-due antistaining activity. The antistaining activity, so referred to herein, includes, among others, the rainwater-borne contaminant removing activity owing to the photocatalytic activity-due organic substance decomposing activity and to the hydrophilicity.

The layer (hereinafter also referred to as "photocatalyst layer") having photocatalytic activity-due antistaining activity is not particularly restricted but may be any layer containing a material having photocatalytic activity.

The material having photocatalytic activity is, for example, a photocatalyst or a silicate coat. The photocatalyst is not particularly restricted but includes, among others, $TiO_2$, $SrTiO_3$, ZnO, CdS and $SnO_2$. Preferred among them is $TiO_2$.

The photocatalyst layer may further contain a hydrophilic material in addition to such a material having photocatalytic activity as mentioned above.

The hydrophilic material is, for example, silica.

Preferred as such photocatalyst layer is a layer containing both $TiO_2$ and silica, among others. More specifically, there may be mentioned one formed by applying a composition containing anatase form titanium oxide, which has photocatalytic activity, to the material surface and capable of exhibiting organic substance decomposing ability and superhydrophilicity on the material surface upon exposure to sunlight. The transparent material decomposes organic contaminants or pollutants adhering to the material surface owing to the organic material decomposing activity and, at the same time, can have the effect of washing organic and inorganic contaminants or pollutants away from the surface owing to the superhydrophilicity.

The photocatalyst layer is generally formed using the above-mentioned material having photocatalytic activity in the form of fine particles. The fine particles preferably have a particle diameter of 0.005 to 1 μm, particularly preferably 0.01 to 0.3 μm.

The photocatalyst layer preferably has a thickness of 0.01 to 10 μm.

The photocatalyst layer can be formed on the transparent material by such a technique as immersion in a solution or dispersion, sputtering, thermal spraying, or spraying.

Specific examples of the transparent material which have a layer having photocatalytic activity-due antistaining properties as provided on the surface thereof as mentioned above, which are currently on the market, include, but are not limited to, the glass materials having such performance characteristics such as BIO CLEAN (product of Saint-Gobain), Active glass (product of Pilkington Plc.), SunClean (product of PPG Industries, Inc.), Hydrotect (product of TOTO Ltd.) and Cleartect (product of Nippon Sheet Glass Co., Ltd.).

<<Use>>

The curable composition of the present invention can be suitably used in adhesives, sealing materials, liquid gaskets and the like. However, these applications are not limitative. Among them, the curable composition of the present invention is optimum as an adhesive, a sealing material and a liquid gasket for the substrate, which is a transparent material, and the like. As the transparent material to be used in the present invention, mentions may be made of, but are not limited to, for example, one used in various fields application which include materials for building and construction, materials for civil engineering, materials for transport, materials for automobile, and the like.

Particularly, the curable composition of the present invention can be used in various fields of application which include, but are not limited to, elastic sealing materials for building and construction and sealing materials for pair glass, electric and electronic part materials such as solar cell back sealers, electric insulating materials such as wire/cable insulating sheath, pressure sensitive adhesive materials, adhesives, elastic adhesives, paints, powder paints, coating compositions, foamed bodies, sealing materials for lids of cans etc., potting materials for electric and electronic use, films, gaskets, casting materials, various molding materials, artificial marble, rustproof and waterproof sealants for end faces (cut sections) of net glass or laminated glass, materials for vibration absorption/vibration suppression/noise reduction/seismic isolation used in an automobile, a vessel, a household electrical appliance and the like, a liquid sealing agent used in an automobile parts, a transportational parts, an airplane parts, an electric parts, various kinds of machine parts, tunnels, highways, cisterns and the like, and the like applications.

BEST MODE FOR CARRYING OUT THE INVENTION

The following examples illustrate the present invention in further detail. These examples are, however, by no means limitative of the scope of the invention.

In the examples and comparative examples below, "parts" and "%" represent "parts by weight" and "% by weight", respectively.

In the examples below, the number average molecular weight and the molecular weight distribution (ratio of the weight average molecular weight to the number average molecular weight) were calculated by a standard polystyrene calibration method using gel permeation chromatography (GPC). In GPC measurement, a polystyrene-crosslinked gel column (Shodex GPC K-804; manufactured by Showa Denko K. K.) and chloroform were used as a GPC column and a mobile solvent, respectively.

As for the curable compositions obtained in the examples and comparative examples below, measurements and evaluations of various physical properties thereof were carried out by the below-mentioned methods.

(Time Required for Skinning at 23° C.)

The composition was adjusted to a thickness of about 3 mm, and the time required for skinning on the surface was measured. For determining the time required for skinning on the surface, the surface of the composition was touched with a spatula at timed intervals and the time at which the composition did not adhere to the spatula was determined. (Temperature: 23° C., relative humidity: 50%)

(Viscosity Measurement)

The viscosity measurement was carried out at 2 rpm or 10 rpm using a type BS viscometer with a No. 7 rotor according to JIS K 7117 (23° C.).

(Physical Properties of Dumbbells)

No. 3 dumbbell specimens were prepared and pulled at a pulling rate of 200 mm/minute until breakage thereof by the method according to JIS K 6251, and the strength at 100% elongation relative to the distance between marked lines (2 cm) and the strength and elongation at rupture were measured.

(Weather Resistant Adhesion to Glass)

Four bead-shaped (40 mm long, 6 mm wide and 10 mm high) masses of the curable composition were each installed on a superficially photocatalyst-coated self-cleaning glass plate (50 mm long, 50 mm wide and 4 mm thick in size, product name: Bio Clean, product of Saint-Gobain) (the photocatalyst is a $TiO_2$ compound) and cured at 23° C. for 28 days, and the cured products were subjected to accelerated weather resistant testing using a xenon weatherometer (product of Suga Test Instruments). The testing conditions were as follows; irradiation energy=180 W/m$^2$ (300 to 400 nm), black panel temperature=63° C., water spraying time=18 minutes/120 minutes.

Specifically, after the lapse of a predetermined time (1,000 hours), an incision (about 5 to 10 mm) was made at the end of each bead sample using a razor and the bead was pulled at 90° by the hand (temperature; 23° C.: humidity; 55%), with the end of the incision as the starting point, for adhesion evaluation. The evaluation was carried out according to the below adhesion standards.

As for the evaluation, the case of cohesive failure on the whole area was represented as "CF", the case of cohesive failure leaving a thin layer as "TCF" (inferior to CF but the level of adhesion being of no practical concern), the case of overall peel at the interface with the adherend and the level thereof being of practical concern, as "AF", and the case of peeling from the interface with the adherend at a certain ratio (area ratio) and the level thereof producing practical problem, as "A (interfacial failure area ratio)" (for example, in the case of 50% interfacial failure, "A50"). A higher cohesive failure percentage indicates a higher level of weather resistant adhesion. Namely, "CF" means that the sample is particularly excellent in adhesion, and "TCF" means that the sample is inferior to the one at "CF" in adhesion but the level of adhesion being of no practical concern. Each of "A" and "AF" respectively means that the sample is low in adhesion and the level of adhesion being of practical concern.

Synthesis Example 1

A 2-liter flask was charged with 8.39 g (58.5 mmol) of cuprous bromide and 112 mL of acetonitrile, and the contents were heated at 70° C. with stirring under a nitrogen stream for 30 minutes. Thereto were added 17.6 g (48.8 mmol) of diethyl 2,5-dibromoadipate and 224 mL (1.56 mol) of n-butyl acrylate, and the mixture was further heated at 70° C. with stirring for 45 minutes. Thereto was added 0.41 mL (1.95 mmol) of pentamethyldiethylenetriamine (hereinafter referred to as "triamine"), and the reaction was thereby started. While continued heating at 70° C. with stirring, 895 mL (6.24 mol) of butyl acrylate was added dropwise intermittently over 160 minutes beginning at 80 minutes after start of the reaction. During this dropping, 1.84 mL (8.81 mmol) of triamine was added. After the lapse of 375 minutes after start of the reaction, 288 mL (1.95 mol) of 1,7-octadiene and 4.1 mL (19.5 mmol) of triamine were added, and the heating at 70° C. with stirring was further continued. At 615 minutes after start of the reaction, the heating was stopped. The reaction mixture was diluted with toluene and filtered, and the filtrate was heated under reduced pressure to give a polymer (polymer [1]). The polymer [1] had a number average molecular weight of 24,000 with a molecular weight distribution of 1.3. The number of alkenyl groups as determined by $^1$H-NMR spectrometry was 2.6 per polymer molecule.

In a nitrogen atmosphere, a 2-liter flask was charged with the polymer [1], 11.9 g (0.121 mol) of potassium acetate and 900 mL of DMAc (N,N-dimethylacetamide), and the mixture was heated at 100° C. with stirring for 11 hours. The DMAc was removed by heating the reaction mixture under reduced pressure, toluene was added for filtration. An adsorbent (200 g, Kyowaad 700PEL, product of Kyowa Chemical) was added to the filtrate, and the mixture was heated at 100° C. with stirring under a nitrogen stream for 3 hours. The adsorbent was filtered off, and the toluene was distilled off from the filtrate under reduced pressure to give a polymer (polymer [2]).

A one-liter pressure-resistant reaction vessel was charged with the polymer [2] (648 g), dimethoxymethylhydrosilane (25.5 mL, 0.207 mol), methyl orthoformate (7.54 mL, 0.0689 mol) and platinum(0)-1,1,3,3-tetramethyl-1,3-divinyldisiloxane complex. The amount of the platinum catalyst used was such that the mole ratio thereof to the alkenyl group in the polymer amounted to $3\times10^{-3}$ equivalents. The mixture was heated at 100° C. with stirring for 2 hours. The volatile matter was then distilled off from the mixture under reduced pressure, whereby a silyl group-terminated polymer (polymer A) was obtained.

The polymer obtained had a number average molecular weight of 30,000 as determined by GPC (on the polystyrene equivalent basis) with a molecular weight distribution of 1.8. The average number of the silyl groups introduced per polymer molecule as determined by $^1$H-NMR spectrometry was 1.9.

Synthesis Example 2

An alkenyl group-terminated vinyl copolymer [3] was obtained in the same manner as in Synthesis Example 1 except that 3.40 g (23.7 mmol) of cuprous bromide, 47 mL of acetonitrile, 7.80 g (21.7 mmol) of diethyl 2,5-dibromoadipate, 336 mL (2.34 mol) of n-butyl acrylate, 59 mL (0.63 mol) of methyl acrylate, 77 mL (0.19 mol) of stearyl acrylate, 2.475 mL (11.86 mmol) of triamine, 141 mL of acetonitrile, 58 mL (0.40 mol) of 1,7-octadiene.

A silyl group-terminated n-butyl acrylate/methyl acrylate/stearyl acrylate copolymer (polymer B) was obtained using the copolymer [3] (260 g) obtained above, as well as dimethoxymethylhydrosilane (8.46 mL, 68.6 mmol), methyl orthoformate (2.50 mL, 22.9 mmol) and a platinum catalyst. The copolymer obtained had a number average molecular weight of 23,000 with a molecular weight distribution of 1.3. The average number of the silyl groups introduced per polymer molecule as determined by $^1$H-NMR spectrometry was about 1.7.

Synthesis Example 3

Using polyoxypropylene diol with a number average molecular weight of 2,000 as an oxyalkylene polymer initiator, propylene oxide (hereinafter, "PO") was reacted therewith in the presence of a compound metal cyanide complex catalyst to give a polyoxyalkylene diol. The obtained polyoxyalkylene diol was reacted with a sodium methoxide, and then with an allyl chloride, to give an allyl ether group-terminated polyoxypropylene of average molecular weight of about 19,000. 800 g of the above-obtained polyoxypropylene was introduced into a pressure-resistant reaction vessel equipped with a stirrer. Methyldimethoxysilane and $1\times10^{-4}$ [eq/vinyl group] of a chloroplatinate catalyst (chloroplatinate hexahydrate) were then added thereto and the resultant mixture was subjected to reaction for 2 hours at 90° C. to produce a crosslinkable silyl group-containing polyoxyalkylene (polymer C). The measurements of the hydroxyl value and the iodine value were carried out, and the terminal-functionalization rate was determined to be about 77%.

Synthesis Example 4

A toluene solution of the copolymer (polymer D) of number average molecular weight of about 18,000 was obtained as a toluene solution by adding, to 50 g of toluene heated to 110° C., a solution of 68 g of n-butyl acrylate, 10 g of methyl methacrylate, 20 g of stearyl methacrylate, 2 g of γ-methacryloxypropylmethyldimethoxysilane, 0.5 g of V-59 (2,2'-azobis (2-methylbutyronitrile); product of Wako Pure Chemical Industries, Ltd.) and 20 g of toluene dropwise over 4 hours under a nitrogen atmosphere. The polymer D has a crosslinkable silyl group and was obtained by a radical polymerization technique other than living radical polymerization.

Example 1

The polymer A obtained in Synthesis Example 1 (100 parts by weight), 3 parts by weight of ethylenebis(oxyethylene)bis [3-(5-tert-butyl-4-hydroxy-m-tolyl)propionate] (product of Ciba Specialty Chemicals; IRGANOX 245) (as an antioxidant), 60 parts by weight of diisodecyl phthalate (product of New Japan Chemical Co., Ltd.; Sansocizer DIDP) (as a plasticizer), 150 parts by weight of surface-treated precipitated calcium carbonate (Shiraishi Kogyo Kaisha, Ltd.; product name: Hakuenka CCR), 20 parts by weight of ground calcium carbonate (product of Maruo Calcium Co.: product name: Nanox 25A), 10 parts by weight of titanium oxide (Ishihara Sangyo Kaisha Ltd.; product name: Tipaque R-820), 2 parts by weight of a bisamide type thixotropic agent (Kusumoto Chemicals Ltd.; product name: DISPARON #6500), 1 part by weight of a benzotriazole-based ultraviolet absorber (Ciba Specialty Chemicals; product name: TINUVIN 213) and 1 part by weight of a hindered amine-based light stabilizer (Sankyo Co., Ltd.; product name: Sanol LS765) were weighed and mixed up and, after through kneading, the mixture was passed three times through a three-roll paint mill for dispersion. The obtained product was dehydrated under reduced pressure at 120° C. for 2 hours followed by cooling to 50° C. or lower, and then 2 parts by weight of vinyltrimethoxysilane (Nippon Unicar Company Limited; product name: A-171) as a dehydrator, 2 parts by weight of N-β-aminoethyl-γ-aminopropyltrimethoxysilane (Nippon Unicar Company Limited; product name: A-1120) as an adhesion promoter and 2 parts by weight of dibutyltin bisacetylacetonate (Nitto Kasei Co., Ltd.; product name: Neostann U-220) as a curing catalyst were added thereto followed by kneading. After kneaded in a state with substantially no moisture, the obtained product was sealed into a moistureproof container to produce a one-pack type curable composition.

Various physical properties of the obtained one-pack type curable composition were measured and evaluated, and the results are shown in Table 1.

Example 2

A curable composition was obtained in the same manner as in Example 1 except that pentaerythrityl tetrakis [3-(3,5-di-tert-butyl-hydroxyphenyl)propionate] (product of Ciba Specialty Chemicals; IRGANOX 1010) was used as an antioxidant in lieu of the hindered phenol compound in Example 1.

Various physical properties of the obtained curable composition were measured and evaluated, and the results are shown in Table 1.

Example 3

A curable composition was obtained in the same manner as in Example 1 except that 70 parts by weight of the polymer B and 30 parts by weight of the polymer C were used in lieu of 100 parts by weight of the polymer A in Example 1.

Various physical properties of the obtained curable composition were measured and evaluated, and the results are shown in Table 1.

Example 4

A curable composition was obtained in the same manner as in Example 1 except that 37.5 parts by weight of the polymer B, 50 parts by weight of the polymer C and 12.5 parts by weight of the polymer D were used in lieu of 100 parts by weight of the polymer A in Example 1.

Various physical properties of the obtained curable composition were measured and evaluated, and the results are shown in Table 1.

Example 5

A curable composition was obtained in the same manner as in Example 1 except that the usage of the IRGANOX 245 was changed to 1 part by weight and 1 part by weight of IRGANOX 1010 was further added.

Various physical properties of the obtained curable composition were measured and evaluated, and the results are shown in Table 1.

Example 6

A curable composition was obtained in the same manner as in Example 1 except that 3 parts by weight of thiodiethylenebis [3-(3,5-di-tert-butyl-hydroxyphenyl)propionate] (product of Ciba Specialty Chemicals; IRGANOX 1035) was used in lieu of IRGANOX 245 in Example 1.

Various physical properties of the obtained curable composition were measured and evaluated, and the results are shown in Table 1.

Example 7

A curable composition was obtained in the same manner as in Example 1 except that 100 parts by weight of the polymer B was used in lieu of the polymer A in Example 1, and 80 parts by weight of the plasticizer polypropyleneglycol with a number average molecular weight of 3,000 (PPG 3000) (product of MITSUI TAKEDA CHEMICALS, INC.; product name: Actcol P-23) in lieu of 60 parts by weight of the plasticizer diisodecyl phthalate (DIDP) in Example 1.

Various physical properties of the obtained curable composition were measured and evaluated, and the results are shown in Table 1.

Example 8

A curable composition was obtained in the same manner as in Example 2 except that 50 parts by weight of the polymer B and 50 parts by weight of the polymer C were used in lieu of 100 parts by weight of the polymer A in Example 2, and 80 parts by weight of the plasticizer PPG 3000 in lieu of 60 parts by weight of the DIDP in Example 2.

Various physical properties of the obtained curable composition were measured and evaluated, and the results are shown in Table 1.

Comparative Example 1

A curable composition was obtained in the same manner as in Example 1 except that the antioxidant was not used.

Various physical properties of the obtained curable composition were measured and evaluated, and the results are shown in Table 2.

Comparative Example 2

A curable composition was obtained in the same manner as in Example 8 except that the antioxidant was not used.

Various physical properties of the obtained curable composition were measured and evaluated, and the results are shown in Table 2.

Example 9

IRGANOX 245 (3 parts by weight), 65 parts by weight of diisoundecyl phthalate (product of ExxonMobil Chemical, product name: DIUP) as a plasticizer, 30 parts by weight of ground calcium carbonate (product of IMERYS, product name: IMERSEAL 50), 150 parts by weight of precipitated calcium carbonate (product of SOLVAY, product name: WINNOFIL SPM), 10 parts by weight of titanium dioxide (product of Kerr-McGee Corporation, product name: RFK2), 4 parts by weight of an amide wax type antisagging agent (product of CRAY VALLEY PRODUCTS Ltd., product name: Crayvallac SLX), 1 part by weight of a hindered amine type light stabilizer (product of Sankyo Co., Ltd., product name: Sanol LS 770) and 1 part by weight of an ultraviolet absorber (product of Ciba Specialty Chemicals, product name: TINUVIN 327) were weighed and mixed up with 100 parts by weight of the polymer A obtained in Synthesis Example 1, and the mixture was passed through a three-roll paint mill three times for dispersion. Then, the mixture was dehydrated under reduced pressure at 80° C. for 2 hours and, after cooling to 50° C. or below, supplemented with 3 parts by weight of vinyltrimethoxysilane (product of Nippon Unicar Company Limited, product name: A171) as a dehydrator and 2 parts by weight of N-β-aminoethyl-γ-aminopropyltrimethoxysilane (product of Nippon Unicar Company Limited, product name: A1120) as a adhesion promoter and with 2 parts by weight of dibutyltin diacetylacetonate (product of Nitto Kasei Co., Ltd., product name: Neostann U220) as a curing catalyst, and the resulting mixture was mixed up with stirring under degassing, kneaded in a state with substantially no moisture and then sealed into a moistureproof container. Thus was obtained a one-pack curable composition. Then, the obtained one-pack curable composition was evaluated for physical properties such as weather resistant adhesion to glass in the same manner as in Example 1. Furthermore, the above-obtained one-pack curable composition was also evaluated according to ISO 11600. The results are shown in Table 4.

(Evaluation Items and Evaluation Conditions According to ISO 11600)

Using two 4-mm-thick glass substrates (12 mm×12 mm×75 mm), H-form evaluation specimens, 12×12×50 mm in sealant size, were prepared and subjected to curing [23° C.×28 days+3 cycles of (70° C.×3 days+23° C.×1 day of immersion in water+70° C.×2 days+23° C.×1 day)]. The cured specimens were subjected to evaluation. For each evaluation item, the evaluation conditions are shown below, together with the desired value.

1. Recovery: The H-form specimen was extended at 23° C. to 100% elongation relative to the sealant width of 12 mm (12 mm elongation) and allowed to stand in that state for 24 hours. One hour after release from the elongation, the recovery was measured. According to the evaluation criterion in ISO 7389, a recovery of 60% or higher was regarded as satisfactory.

2. Modulus measurement: The H form was extended by 100% at −20° C. or 23° C. and the modulus was measured. According to the modulus at each temperature, classification was made as follows.

(Classification by Modulus)

25LM: M100 (100% modulus) at −20° C.≦0.6 MPa and M100 at 23° C.≦0.4 MPa

25HM: M100 (100% modulus) at −20° C.≧0.6 MPa and M100 at 23° C.≧0.4 MPa

The evaluation conditions were as specified in ISO 8339.

3. Tensile property retention at maintained extension: The H form was extended by 100% at 23° C. and, after 24 hours of maintenance, the occurrence or nonoccurrence of breakage of the sealant was confirmed. (Desired value: no breakage.) The evaluation conditions were as specified in ISO 8340.

4. Adhesion durability at each temperature: The H form was subjected to 2 cycles of the following test: 25% elongation at −20° C.+25% compression at 70° C.+25% elongation at −20° C.+25% compression test at 70° C., followed by release from compression and 24 hours of standing at 23° C. The evaluation conditions were as specified in ISO 9047.

5. Adhesion after weather resistance testing: Using ATLAS Electric Devices Company' xenon weatherometer, irradiation was made from the reverse side of the sealant under the following conditions for 500 hours: irradiation energy=60 W/m$^2$, black panel temperature=63° C., water spraying conditions=18 minutes/120 testing time. After completion of the irradiation, the specimen was extended by 100% at 23° C. and, after 24 hours of standing, the state of the sealant was observed (desired value: no breakage). The evaluation conditions were as specified in ISO 11431.

6. Adhesion at maintained extension following water resistance testing: After 4 days of submersion testing in water at 23° C., the H form was extended by 100% at 23° C. and, after 24 hours of standing, the state of the sealant was observed. (Desired value: no breakage). The evaluation conditions were as specified in ISO 10590.

7. Slip/slump: A polyethylene sheet was placed on the inside bottom of a U-shaped aluminum profile (20×10×150 mm) at 23° C. and filling with the sealant, the whole was allowed to stand in a vertical position at 70° C., 50° C. or 5° C. for 24 hours, followed by observation (desired value: slippage not exceeding 3 mm at each temperature). The evaluation conditions were as specified in ISO 7390.

Example 10

A one-pack curable composition was prepared in the same manner as in Example 9 except that 70 parts by weight of the polymer A, 30 parts by weight of the polymer C were used in lieu of 100 parts by weight of the polymer A in Example 9, the ground calcium carbonate, precipitated calcium carbonate and amide wax type thixotropic agent were used in amounts of 90 parts by weight, 90 parts by weight and 8 parts by weight, respectively. Then, the obtained one-pack curable composition was evaluated for physical properties such as weather resistant adhesion to glass in the same manner as in Example 1. Furthermore, the above-obtained one-pack curable composition was also evaluated according to ISO 11600 in the same manner as in Example 9. The results are shown in Table 4. It is seen that even when changes were made with respect to calcium carbonate, titanium oxide, plasticizer and amide wax type thixotropic agent species, the cured products obtained in Examples 9 and 10 showed excellent weather resistant adhesion as in Examples 1 to 8. Further, it could be confirmed that the requirements of ISO 11600, a standard for certification concerning European glazing sealants, were satisfied.

Comparative Example 3

A one-pack curable composition was obtained in the same manner as in Example 9 except that 3 parts by weight of IRGANOX 245 in Example 9 was not used.

Various physical properties of the obtained one-pack curable composition were evaluated in the same manner as in Example 9, and the results are shown in Table 4.

Comparative Example 4

A one-pack curable composition was prepared in the same manner as in Example 10 except that 3 parts by weight of IRGANOX 245 in Example 10 was not used.

Various physical properties of the obtained one-pack curable composition were evaluated in the same manner as in Example 9, and the results are shown in Table 4.

With each of the one-pack compositions of Comparative Examples 3 and 4, the adhesion to self-cleaning glass after weather resistance testing using a xenon weatherometer was unsatisfactory and, in addition, the results of adhesion testing after weather resistance testing (500 hours of xenon lamp irradiation) failed to meet the requirements of ISO 11600.

TABLE 1

| | | Example | | | | | | | |
|---|---|---|---|---|---|---|---|---|---|
| | | 1 | 2 | 3 | 4 | 5 | 6 | 7 | 8 |
| Material composition | Crosslinkable silyl group-containing vinyl polymer produced by living radical polymerization (polymer A) | 100 | 100 | | | 100 | 100 | | |
| | Crosslinkable silyl group-containing vinyl polymer produced by living radical polymerization (polymer B) | | | 70 | 37.5 | | | 100 | 50 |
| | IRGANOX245 | 3 | | 3 | 3 | 1 | | 3 | |
| | IRGANOX1010 | | 3 | | | 1 | | | 3 |

TABLE 1-continued

|  |  |  | Example |  |  |  |  |  |  |  |
|---|---|---|---|---|---|---|---|---|---|---|
|  |  |  | 1 | 2 | 3 | 4 | 5 | 6 | 7 | 8 |
|  | IRGANOX1035 |  |  |  |  |  |  | 3 |  |  |
|  | Crosslinkable silyl group-containing polyoxyalkylene polymer (polymer C) |  |  |  | 30 | 50 |  |  |  | 50 |
|  | Crosslinkable silyl group-containing (meth)acrylate polymer (polymer D) |  |  |  |  | 12.5 |  |  |  |  |
|  | Diisodecyl phthalate |  | 60 | 60 | 60 | 60 | 60 | 60 |  |  |
|  | Polypropylene plasticizer (Mw = 3,000) |  |  |  |  |  |  |  | 80 | 80 |
|  | Precipitated calcium carbonate |  | 150 | 150 | 150 | 150 | 150 | 150 | 150 | 150 |
|  | Ground calcium carbonate |  | 20 | 20 | 20 | 20 | 20 | 20 | 20 | 20 |
|  | Titanium oxide |  | 10 | 10 | 10 | 10 | 10 | 10 | 10 | 10 |
|  | Bisamide type thixotropic agent |  | 2 | 2 | 2 | 2 | 2 | 2 | 2 | 2 |
|  | Ultraviolet absorber |  | 1 | 1 | 1 | 1 | 1 | 1 | 1 | 1 |
|  | Light stabilizer |  | 1 | 1 | 1 | 1 | 1 | 1 | 1 | 1 |
|  | Vinyltrimethoxysilane |  | 2 | 2 | 2 | 2 | 2 | 2 | 2 | 2 |
|  | N-(β-aminoethyl)-γ-aminopropyltrimethoxysilane |  | 2 | 2 | 2 | 2 | 2 | 2 | 2 | 2 |
|  | Curing catalyst U-220 |  | 2 | 2 | 2 | 2 | 2 | 2 | 2 | 2 |
| Physical property's data | Time required for skinning at 23° C. (min) |  | 50 | 55 | 50 | 50 | 55 | 60 | 60 | 70 |
|  | Viscosity (Pa · s) | 2 rpm | 1700 | 1680 | 1500 | 1700 | 1620 | 1690 | 1750 | 1450 |
|  |  | 10 rpm | 580 | 550 | 520 | 490 | 550 | 530 | 550 | 410 |
|  |  | Viscosity proportion (2/10 rpm) | 2.93 | 3.05 | 2.88 | 3.47 | 2.95 | 3.18 | 3.18 | 3.54 |
|  | Physical properties of dumbbells | M100(MPa) | 0.41 | 0.45 | 0.38 | 0.57 | 0.45 | 0.39 | 0.13 | 0.31 |
|  |  | TB(MPa) | 0.95 | 1.00 | 1.61 | 1.69 | 1.00 | 0.96 | 0.81 | 1.28 |
|  |  | EB (%) | 380 | 400 | 650 | 630 | 390 | 370 | 380 | 730 |
|  | Test Result of the weather resistant adhesion to glass by a xenon weatherometer | Initial | CF | CF | CF | CF | CF | CF | CF | CF |
|  |  | 1,000 hours | CF | CF | CF | CF | CF | CF | CF | CF |
|  |  | 2,000 hours | CF | CF | TCF | TCF | CF | CF | CF | TCF |

\* Adhesion evaluation criteria: CF (of no problem), TCF (inferior to CF but of no practical problem). AF (complete peeling at the interface with the adherend, posing a problem), A (a certain percentage of peeling at the interface with the adherend, posing a practical problem).

TABLE 2

|  |  |  | Comparative Example |  |
|---|---|---|---|---|
|  |  |  | 1 | 2 |
| Material composition | Crosslinkable silyl group-containing vinyl polymer produced by living radical polymerization (polymer A) |  | 100 |  |
|  | Crosslinkable silyl group-containing vinyl polymer produced by living radical polymerization (polymer B) |  |  | 50 |
|  | Crosslinkable silyl group-containing polyoxyalkylene polymer (polymer C) |  |  | 50 |
|  | Diisodecyl phthalate |  | 60 |  |
|  | Polypropylene plasticizer (Mw = 3,000) |  |  | 80 |
|  | Precipitated calcium carbonate |  | 150 | 150 |
|  | Ground calcium carbonate |  | 20 | 20 |
|  | Titanium oxide |  | 10 | 10 |
|  | Bisamide type thixotropic agent |  | 2 | 2 |
|  | Ultraviolet absorber |  | 1 | 1 |
|  | Light stabilizer |  | 1 | 1 |
|  | Vinyltrimethoxysilane |  | 2 | 2 |
|  | N-(β-aminoethyl)-γ-aminopropyltrimethoxysilane |  | 2 | 2 |
|  | Curing catalyst U-220 |  | 2 | 2 |
| Physical property's data | Time required for skinning at 23° C. (min) |  | 55 | 70 |
|  | Viscosity (Pa · s) | 2 rpm | 1630 | 1420 |
|  |  | 10 rpm | 560 | 400 |
|  |  | Viscosity proportion (2/10 rpm) | 2.91 | 3.55 |
|  | Physical properties of dumbbells | M100(MPa) | 0.47 | 0.32 |
|  |  | TB(MPa) | 1.01 | 1.31 |
|  |  | EB (%) | 380 | 710 |
|  | Test Result of the weather resistant adhesion to glass by a xenon weatherometer | Initial | CF | CF |
|  |  | 1,000 hours | A90 | AF |
|  |  | 2,000 hours | A90 | AF |
|  |  | 3,000 hours | AF | AF |

TABLE 3

|  |  | Example |  | Comparative Example |  |
|---|---|---|---|---|---|
|  |  | 9 | 10 | 3 | 4 |
| Material composition | Crosslinkable silyl group-containing vinyl polymer produced by living radical polymerization (polymer A) | 100 | 70 | 100 | 70 |
|  | IRGANOX245 | 3 | 3 | — | — |
|  | Crosslinkable silyl group-containing polyoxyalkylene polymer (polymer C) | — | 30 | — | 30 |
|  | Diisoundecyl phthalate | 65 | 65 | 65 | 65 |
|  | Ground calcium carbonate | 30 | 90 | 30 | 90 |

TABLE 3-continued

|  | Example | | Comparative Example | |
|---|---|---|---|---|
|  | 9 | 10 | 3 | 4 |
| Precipitated calcium carbonate | 150 | 90 | 150 | 90 |
| Titanium oxide | 10 | 10 | 10 | 10 |
| Amide wax type thixotropic agent | 4 | 8 | 4 | 8 |
| Ultraviolet absorber | 1 | 1 | 1 | 1 |
| Light stabilizer | 1 | 1 | 1 | 1 |
| Vinyltrimethoxysilane | 3 | 3 | 3 | 3 |
| N-(β-aminoethyl)-γ-aminopropyl-trimethoxysilane | 2 | 2 | 2 | 2 |
| Curing catalyst U-220 | 2 | 2 | 2 | 2 |

TABLE 4

|  |  |  | Example | | Comparteive Example | |
|---|---|---|---|---|---|---|
|  |  |  | 9 | 10 | 3 | 4 |
| Physical property's data | Time required for skinning at 23° C. (min) | | 70 | 50 | 70 | 50 |
|  | Viscosity (Pa·s) | 2 rpm | 1900 | 1650 | 2000 | 1720 |
|  |  | 10 rpm | 610 | 510 | 612 | 510 |
|  |  | Viscosity proportion (2/10 rpm) | 3.11 | 3.24 | 3.27 | 3.37 |
|  | Physical properties of dumbbells | M100(MPa) | 0.66 | 0.70 | 0.65 | 0.66 |
|  |  | TB(MPa) | 1.34 | 1.45 | 1.35 | 1.48 |
|  |  | EB (%) | 270 | 520 | 280 | 520 |
|  | Test Result of the weather resistant adhesion to glass by a xenon weatherometer | Initial | CF | CF | CF | CF |
|  |  | 1,000 hours | CF | CF | AF | AF |
| Compatibility with the requirements of ISO 11600 | | | | | | |
| Recovery (desired value: 60% or more) | | | 69% | 75% | 68% | 73% |
| Modulus(MPa) | | −20° C. | 0.70 | 0.77 | 0.72 | 0.77 |
|  | | 23° C. | 0.50 | 0.58 | 0.48 | 0.54 |
|  | | category | 25HM | 25HM | 25HM | 25HM |
| Tensile property retention at maintained extension | | | Good | Good | Good | Good |
| Adhesion durability at each temperature | | | Good | Good | Good | Good |
| Adhesion after weather resistance testing | | | Good | Good | A80 | AF |
| Adhesion at maintained extension following water resistance testing | | | Good | Good | Good | Good |
| Slip/slump | | 5° C. | 0 mm | 0 mm | 0 mm | 0 mm |
|  | | 50° C. | 0 mm | 0 mm | 0 mm | 0 mm |
|  | | 70° C. | 0 mm | 0 mm | 0 mm | 0 mm |
| Evaluation | | | Passed | Passed | Failed | Failed |

From the results in Tables 1 and 2, the curable composition of the invention is shown to be particularly more excellent in the weather-resistant adhesion properties after prolonged period of time, for example after 1,000 or 2,000 hours, than the curable compositions, which do not contain an antioxidant, of Comparable Examples.

INDUSTRIAL APPLICABILITY

The present invention provides a curable composition having excellent adhesion properties against all-purpose adherends and excellent weather-resistant adhesion properties against photocatalyst-coated transparent adherends, remaining low in surface staining for a long period of time, and showing high weather resistance without undergoing surface cracking or discoloration.

The invention claimed is:

1. A structure, comprising:
   a transparent material;
   a layer having photocatalytic activity-based antistaining properties provided on a surface of the transparent material; and
   a cured product provided on the layer having photocatalytic activity-based antistaining properties,
   wherein the cured product is formed from a curable composition that comprises
   a vinyl polymer (I) having a main chain that is a product of living radical polymerization and containing at least one crosslinkable silyl group, and
   an antioxidant (II).

2. The structure according to claim 1,
   wherein the transparent material is selected from a building material, a construction material, a material for-civil engineering material, a transportation material, or a material for automobiles.

3. The structure according to claim 2,
   wherein the transparent material is glass, a polycarbonate, or a (meth)acrylic resin.

4. The structure according to claim 1,
   wherein the layer having photocatalytic activity-based antistaining properties provided on the surface of the transparent material is a layer comprising a material having photocatalytic activity and further comprising a hydrophilic material.

5. The structure according to claim 1,
   wherein the antioxidant (II) is a hindered phenol compound.

6. The structure according claim 1,
wherein the curable composition further comprises a plasticizer (III).

7. The structure according to claim 6,
wherein the plasticizer (III) is a phthalic ester.

8. The structure according to claim 6,
wherein the plasticizer (III) is a polyoxyalkylene polymer.

9. The structure claim 1,
wherein the vinyl polymer (I) has a molecular weight distribution of less than 1.8.

10. The structure according to claim 1,
wherein the main chain of the vinyl polymer (I) comprises a polymer of a vinyl monomer at least one selected from the group consisting of (meth)acrylic monomers, acrylonitrile monomers, aromatic vinyl monomers, fluorine-containing vinyl monomers and siliconcontaining vinyl monomers as a major component.

11. The structure according to claim 10,
wherein the main chain of the vinyl polymer (I) is a (meth)acrylic polymer.

12. The structure according to claim 1,
wherein the main chain of the vinyl polymer (I) is an acrylic polymer.

13. The structure according to claim 12,
wherein the main chain of the vinyl polymer (1) is an acrylic ester polymer.

14. The structure according to claim 1,
wherein the product of living radical polymerization as the main chain of the vinyl polymer (I) is a product of atom transfer radical polymerization.

15. The structure according to claim 14,
wherein the product of atom transfer radical polymerization is obtained in a presence of a transition metal complex catalyst comprising at least one element selected from the group consisting of a VII, VIII, IX, X, or XI group element in the periodic table as a central metal.

16. The structure according to claim 15,
wherein the transition metal complex catalyst is a complex having copper, nickel, ruthenium, or iron as a central metal.

17. The structure according to claim 16,
wherein the transition metal complex catalyst is a complex of copper.

18. The structure according to claim 1,
wherein the crosslinkable silyl group of the vinyl polymer (I) is represented by a following general formula 1:

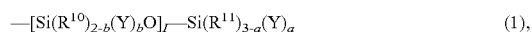

wherein $R^{10}$ and $R^{11}$ are the same or different, and each of $R^{10}$ and $R^{11}$ is independently an alkyl group containing 1 to 20 carbon atoms, an aryl group containing 6 to 20 carbon atoms, an aralkyl group containing 7 to 20 carbon atoms, or a triorganosiloxy group represented by $(R')_3SiO-$ (in which R' represents a univalent hydrocarbon group containing 1 to 20 carbon atoms and the three R' groups may be the same or different) and, when there are two or more $R^{10}$ or $R^{11}$ groups, they may be the same or different; Y represents a hydroxyl group or a hydrolyzable group, and when there are two or more Y groups, they may be the same or different, a represents 1, 2 or 3, b represents 0, 1 or 2, and l represents an integer of 0 to 19, provided that a relation $$a + l \times b \geq 1$$

should be satisfied.

19. The structure according to claim 1,
wherein the crosslinkable silyl group of the vinyl polymer (I) is located at a terminus of the main chain.

20. The structure according to claim 1,
wherein the curable composition further comprises a polyoxyalkylene polymer (IV) comprising at least one crosslinkable silyl group in an amount in a range of 0.1 to 1,000 parts by weight per 100 parts by weight of the vinyl polymer (I).

21. The structure according to claim 1,
wherein the curable composition further comprises a polymer (V), which contains a crosslinkable silyl group, as a product of a radical polymerization technique, which is different from the living radical polymerization, in an amount within a range of 3 to 300 parts by weight per 100 parts by weight of the vinyl polymer (I).

22. The structure according to claim 1,
wherein the curable composition further comprises 0.1 to 20 parts by weight of a tin curing catalyst (VI) per 100 parts by weight of the vinyl polymer (I).

23. The structure according to claim 1,
wherein the layer having photocatalytic activity-based antistaining properties has a thickness of 0.01 to 10 μm.

* * * * *